(12) United States Patent
Baras et al.

(10) Patent No.: US 9,161,214 B2
(45) Date of Patent: Oct. 13, 2015

(54) WIRELESS COMMUNICATION METHOD AND SYSTEM FOR TRANSMISSION AUTHENTICATION AT THE PHYSICAL LAYER

(71) Applicant: UNIVERSITY OF MARYLAND, College Park, MD (US)

(72) Inventors: John S. Baras, Potomac, MD (US); Paul L. Yu, Silver Spring, MD (US); Brian M. Sadler, Laurel, MD (US)

(73) Assignees: University of Maryland, College Park, MD (US); The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/770,181

(22) Filed: Feb. 19, 2013

(65) Prior Publication Data
US 2013/0163761 A1   Jun. 27, 2013

Related U.S. Application Data

(63) Continuation of application No. 12/676,689, filed on Mar. 5, 2010, now abandoned.

(51) Int. Cl.
| | |
|---|---|
| *H04L 29/06* | (2006.01) |
| *H04W 12/02* | (2009.01) |
| *H04W 12/10* | (2009.01) |
| *H04K 3/00* | (2006.01) |
| *H04W 12/06* | (2009.01) |
| *H04H 20/57* | (2008.01) |

(52) U.S. Cl.
CPC ............. *H04W 12/02* (2013.01); *H04K 3/25* (2013.01); *H04K 3/255* (2013.01); *H04W 12/10* (2013.01); *H04H 20/57* (2013.01); *H04W 12/06* (2013.01)

(58) Field of Classification Search
CPC ..... H04W 12/02; H04W 12/06; H04H 20/57; H04H 2201/50
USPC .......................................... 380/271; 382/232
See application file for complete search history.

(56) References Cited

U.S. PATENT DOCUMENTS

| | | | | |
|---|---|---|---|---|
| 2004/0022444 | A1* | 2/2004 | Rhoads ......................... | 382/232 |
| 2004/0165657 | A1* | 8/2004 | Simic et al. .................. | 375/211 |
| 2005/0180315 | A1* | 8/2005 | Chitrapu et al. ............. | 370/208 |
| 2005/0249304 | A1* | 11/2005 | Takano et al. ................ | 375/267 |
| 2009/0011783 | A1* | 1/2009 | Kitazoe ........................ | 455/517 |

OTHER PUBLICATIONS

Lisa M. Marvel et al., Spread Spectrum Image Steganography, Aug. 1999, IEEE Transactions on Image Processing, vol. 8, No. 8, pp. 1075-1083.*

F. A. Brooks, Variable and Constant Volume Operation in Telephone Communication Systems, Sep. 1964, IEEE Transactions on Communication Technology, pp. 49-57.*

* cited by examiner

*Primary Examiner* — Carl Colin
*Assistant Examiner* — Gary Lavelle
(74) *Attorney, Agent, or Firm* — Rosenberg, Klein & Lee

(57) ABSTRACT

The subject authentication scheme encompasses a large family of authentication systems which may be built over existing transmission systems. By superimposing a carefully designed secret modulation on the waveforms, authentication is added to the signal without requiring additional bandwidth. The authentication information (tag signal) is sent concurrently with data (message signal). The authentication is designed to be stealthy to the uninformed user, robust to interference, and secure for identity verification. The tradeoffs between these three goals are identified and analyzed. The use of the authentication for channel estimation is also considered, and improved bit errors are demonstrated for time-varying channels. With a long enough authentication code word an authentication system is achieved with very slight data degradation. Additionally, by treating the authentication tag as a sequence of pilot symbols, the data recovery may be improved by the aware receiver.

20 Claims, 10 Drawing Sheets

WIRELESS COMMUNICATION METHOD AND SYSTEM FOR TRANSMISSION AUTHENTICATION AT THE PHYSICAL LAYER

REFERENCE TO RELATED APPLICATIONS

This utility Patent Application is a Continuation Application based on Ser. No. 12/676,689, filed on 5 Mar. 2010 which is based on Provisional Patent Application Ser. No. 60/970,576 filed 7 Sep. 2007.

The work was funded by the U.S. Government Army Research Lab Contract Number DAAD190120011. The United States Government has certain rights to the Invention.

FIELD OF THE INVENTION

The present Invention relates to wireless communication, and in particular, to authenticated communication between a sender and receiver of a signal.

More in particular, the present invention is directed to a wireless communication system in which an authentication scheme is provided at the physical layer of the network system and in which an authenticated message signal is constructed with specific constraints and requirements applied to provide enhanced stealth, robustness and security of the communication.

In overall concept, the present invention is directed to an authentication technique implemented by tagging a message signal to be transmitted with an authentication tag signal which is transmitted concurrently with the message signal via a transmission media to an aware receiver. The received communication signal is analyzed to establish its authenticity and is further processed for message recovery. Of utmost importance in the scheme of the secure communication according to the present invention is that both sender and the receiver of the message signal are provided with a secret key k which is used in generation of the tag signal and wherein parameters of the authentication scheme are controlled to attain improved security.

BACKGROUND OF THE INVENTION

In conventional digital communications systems, a sender uses a message signal to transmit message symbols to a receiver. The sender and receiver agree upon a transmission scheme such that the mapping between signals and symbols are unique and known by both parties. In order to satisfy requirements for stealth, robustness, and security of a communication system, authentication, integrity, and secrecy of the signal transmission via a transmitting media is to be provided. For an authentication system, uniqueness and non-reproducibility of the identification signal are of the utmost importance.

Research in authentication techniques have focused mostly above the Physical Layer (PHY) of the Open System Interconnection (OSI) model underlying the operation of the network system. As is known to those skilled in the art, the OSI model is an abstract description for layered communications and computer network protocol design. The OSI divides network architecture into seven layers, out of which the Physical Layer (PHY) is the bottom layer. The function of the PHY is to define the electrical and physical specifications of a device, and, in particular, to define the relationship between the device and a physical medium, including performing encoding and signaling functions that transform data from bits residing within a device into signals to be sent over the network. The PHY also defines specifications as to data transmission and reception at the device.

There are two paradigms conventionally used in communication systems for adding authentication: multiplexing or embedding. Examples of multiplexed authentication may be represented by message authentication codes or authentication protocols that require a series of message devoted to authentication. An overview of these methods may be found in G. J. Simmons, "A survey of information authentication", Proceedings of the IEEE, Volume 76, Issue 5, May 1988, pp. 603-620; as well as in Chapters 9 and 10 of A. J. Menezes, P. C. van Oorschot, and S. A. Vanstone, "Handbook of Applied Cryptography", $5^{th}$ printing, CRC Press, 2001. The advantage of these methods is that the authentication is received with the same quality as the data. However, data throughput is penalized since some of the bits carry authentication instead of data.

In 1972, T. Cover, "Broadcast channels", IEEE Transactions on Information Theory, Volume 18, Issue 1, January 1972, pp. 2-14 analyzed broadcast channels and demonstrated that high joint rates of transmissions are best achieved with simultaneous, as opposed to time-multiplexed, transmissions. Digital watermarking follows the paradigm of embedded signaling by modifying the data in a controlled manner that provides additional information to the receiver. Authentication may be transmitted in this manner as presented in C. Fei, D. Kundur, and R. H. Kwong, "Analysis and Design of Secure Watermark-based Authentication Systems", IEEE Transactions on Information Forensics and Security, Volume 1, No. 1, March 2006, pp. 43-55; as well as in L. M. Marvel, C. G. Boncelet, and C. T. Retter, "Spread Spectrum Image Steganography", IEEE Transactions on Image Processing, Volume 8, Issue 8, August 1999, pp. 1075-1083. The embedded signaling for adding the authentication has proven to provide stealthy authentication. However, as opposed to the multiplexing approach, embedding of additional information degrades the data quality (I. J. Cox, M. L. Miller, and A. L. McKellips, "Watermarking as Communications with Side Information", Proceedings of the IEEE, Volume 87, Issue 7, July 1999, pp. 1127-1141). Much of the research in digital watermarking has focused on watermarking multimedia data and minimizing the distortion at the receiver in terms of human perception.

At the Physical Layer, work has been done in authenticating the sender and receiver based on prior coordination or secret sharing, where the sender is authenticated if the receiver can successfully demodulate and decode the transmission. Spread spectrum techniques, such as direct sequence and frequency hopping, may be viewed as examples of physical layer authentication systems (J. G. Proakis, Digital Communications, $4^{th}$ ed. New York: McGraw-Hill, 29000, Chapters 5, 13). While these techniques are covert and provide robustness to interference, they achieve this at the cost of bandwidth expansion. Additionally, if it is desired to add authentication to a system in a stealthy way so that users unaware of the authentication continue to communicate without modifications to hardware or protocol, the technique does not serve this purpose well, since only authenticated parties with knowledge of the secret are allowed to participate in communications. The need for such stealth arises, for example, when authentication is piggybacked onto an existing system.

The idea of transparently adding information at the physical layer has been studied for some specific cases. S. H. Supangkat, T. Eric, and A. S. Pamuji, "A public key signature for authentication in telephone", APCCAS 2002, Volume 2, pp. 495-498 proposed one such authentication scheme for telephony where an encrypted hash of the conversation is added back into the signal. Similarly, J. E. Kleider, S. Gifford, S. Chuprum, and B. Fette, "Radio Frequency Watermarking for OFDM Wireless Networks", ICASSP 2004, Volume 5, pp. 397-400 proposed a scheme where a low-power watermark signal is added to the data signal with spread spectrum techniques. X. Wang, Y. Wu, and B. Caron, "Transmitter identification using embedded pseudo random sequences", IEEE Transactions on Broadcasting, Volume 50, Issue 3, September 2004, pp. 244-252 proposed a scheme for broadcast television where each transmitter adds a unique low-power signal to its transmission in order to prove its identity to the receivers.

The transparent transmission of data may also be built by using multi-resolution transmission, where varying levels of protection are guaranteed for multiple data streams as presented in L. F. Wei, "Coded modulation with unequal error protection", IEEE Transactions on Communications, Volume 41, Issue 10, October 1993, pp. 1439-1449; P. K. Vitthaladevuni and M. S. Alouini, "Exact BER computations of generalized hierarchical PSK constellations:", IEEE Transactions on Communications, Volume 51, Issue 12, December 2003, pp. 2030-2037; and M. Morimoto, M. Okada, and S. Komaki, "A hierarchical image transmission system in a fading channel", Fourth IEEE International Conference on Universal Personal Communications, November 1995, pp. 769-772. With this scheme, data symbols are sent at high rate while the authentication is sent at a lower rate. Multi-resolution (also known as asymmetric or nonuniform) constellations provide important data signal points to be far apart while less important signal points are close together.

Authentication at the physical layer may be viewed as a special use of pilot symbols inserted in the transmitted signal, since the authentication signal is verified and therefore known at the receiver. However, a subtle difference arises since the authentication signal may or may not be present in the received signal. Pilot symbols are either time division multiplexed (TDM) or superimposed (SI) with the transmitted messages. M. Dong, L. Tong, B. M. Sadler, "Optimal insertion of pilot symbols for transmission over time-varying flat fading channels" IEEE Transactions on Signal Processing, Volume 52, Issue 5, May 2004, pp. 1403-1418 showed that SI schemes may outperform TDM schemes when the transmission channel becomes sufficiently time varying. For a packet-based multi-carrier system, J. E. Kleider, G. Maalouli, S. Gifford, S. Chuprun, "Preamble and embedded synchronization for RF carrier frequency-hopped OFDM", IEEE Journal on Selected Areas in Communications, Volume 23, Issue 5, May 2005, pp. 920-931 suggested that SI pilot symbols may be used for channel acquisition while incurring only a 1 dB penalty when compared to a TDM training scheme.

Although a vast amount of research has been performed in the field of authenticated communication there still is a need to improve stealth, robustness and security of authentication schemes by hiding the authentication in the physical waveform while maintaining high levels of robustness and security.

SUMMARY OF THE INVENTION

It is an object of the present invention to provide an authentication scheme designed to be stealthy to the uninformed user, robust to interference, and secure for identity verification.

It is another object of the present invention to provide an authentication scheme which permits concealment of the authentication from a bystander so that the bystander cannot detect anomalies of a transmitted signal or experience changes in his/her own performance as a result of the authentication.

Further, it is an object of the authentication scheme of the present invention to provide improved resistance of the authentication to interference as well as to protect the authentication from being transparent to an adversary.

It is also an object of the present invention to provide an authentication scheme built over existing transmission systems where authentication information is sent concurrently with data without requiring extra bandwidth or transmission power. Using a long enough authentication code word, a useful authentication system may be achieved with very slight data degradation. Specific constraints are applied to the tag signal to enhance the security of the transmission.

In one aspect of the present invention there is provided a method for communication authentication performed at the physical layer of a wireless communication system in which both a transmitter node and a receiver node are provided with a secret key k. A tagged signal is created and transmitted from the sender to the receiver via the wireless communication channel. The received communication signal is processed at the receiver to determine whether the tag signal is present in the received communication signal and to establish the authenticity of the received communication signal if the tag is found. The message is further recovered from the received communication signal upon establishing the authenticity of the received communication signal at the receiver.

In order to "judge" the authenticity of the received communication signal, the receiver estimates the wireless communication channel by analyzing pilot symbols p inserted in the communication signal between the blocks of the tagged message, and further obtains message signal estimation from the received communication signal. The receiver generates an estimated tag based on the estimated message signal and the secret key k known to the receiver. The receiver studies the received communication signal for the presence of the estimated tag by match filtering the residual of the received communication signal with the estimated tag. The authenticity decision is made based on a threshold probability of the tag detection for a predetermined model of the wireless communication channel.

It is important to the covertness of the authentication scheme that the tagged signal follows the bandwidth constraints of the message signal and the authentication tag signal is a low energy signal. Covertness improvement is also aided by the fact that the authentication tag signal may follow a noise-like distribution. If the noise parameters of the received communication signal exceed predetermined value ranges, the received communication signal may be flagged as anomalous, and authenticity is not granted to the this signal.

In order to improve the robustness of the authenticity scheme, the power of the transmitted tag signal is raised. Additionally, it has been found that analyzing a sequence of multiple tagged signal blocks in the received signal instead of each tagged signal block separately, enhances the robustness of the scheme.

For security purposes, it is preferred to use a time varying authentication tag signal generated by a pseudo-random number generator. The secret key k of a predetermined entropy value also benefits the security improvement. The secret key k is better protected in channels with higher noise levels. An additional approach to improving the authenticity scheme is to maintain the value of the coefficient $\rho_s^2$ corresponding to the presence of the message signal in the tagged signal at a high level ($\geq 0.985$).

The present invention in another aspect, represents a wireless communication system with transmission authentication at the physical layer. The system includes a transmitter node and a receiver node sharing a secret key k connected by a wireless communication channel. A tag generator generates an authentication tag signal t by using a tag generating function, the secret key k, and the message signal to be transmitted. A tagged signal is constructed by superimposing the tag signal on the message signal.

The system further includes the authenticity decision block at the receiver and a message recovering unit coupled to the authenticity decision block to recover the transmitted message when the authenticity of the sender is established.

In the communication system of the present invention it is important to construct the tagged signal in a manner which provides improved stealth, security and robustness to the authentication scheme. Therefore, it is preferred that the tag generation function is a pseudo-random number generator, and the secret key k is to be of a predetermined entropy value. Additionally, the tag signal $t_i$ is a time varying signal depending on the number i of the message signal $s_i$, wherein the tag signal has a bandwidth similar to the message signal $s_i$, and the energy of the authentication tag signal is below a predetermined value. It is also important that the receiver bases its decision of the authentication on analyzing a sequence of multiple tagged signal blocks of the received communication signal rather than on each tagged signal block separately. Also it is of importance that the value of the $\rho_s^2$ is maintained at a high level, for example, >0.985.

These and other features and advantages of the present invention will become apparent after reading a further description of the preferred embodiment in conjunction with the Patent Drawings.

PREFERRED EMBODIMENT OF THE PRESENT INVENTION

Figure 1:
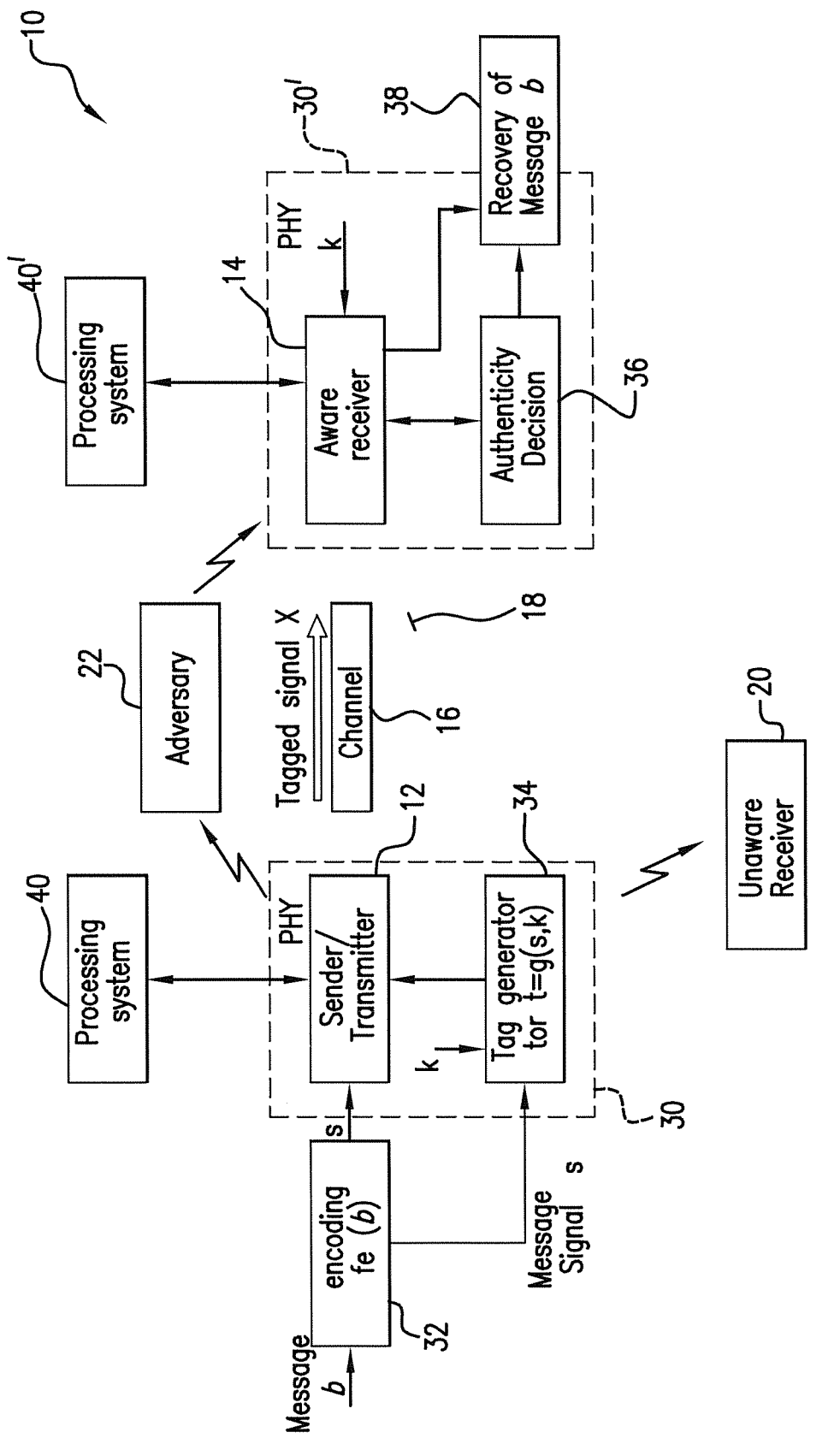
FIG. 1 is a schematic representation of the communication system with the authentication scheme of the present invention.

Referring to FIG. 1, a communication system 10 of the present invention includes a sender/transmitter 12 and an aware receiver 14 which both agree on a keyed authentication scheme to permit the aware receiver 14 to verify the messages received from the sender/transmitter 12. The sender/transmitter 12 and the aware receiver 14 are connected through the transmitting channel 16 for wireless communication therebetween. The sender/transmitter 12 sends the receiver 14 a proof of authentication, e.g., an authentication tag, with each message for the aware receiver's 14 verification. The tagged signal $x_i = \rho_s s_i + \rho_t t_i$ is sent through the transmitting channel 16 from the sender/transmitter 12, wherein the tag $t_i$ reflects knowledge of the secret key shared between the sender/transmitter 12 and the aware receiver 14.

The wireless medium 18 between the sender/transmitter 12 and aware receiver 14 is also shared with the unaware receiver 20 and aware receiver active adversary 22. When the sender/transmitter 12 sends messages to the aware receiver 14, the unaware receiver 20 and active adversary 22 "listen" on the wireless medium 18 to recover the messages sent from the sender/transmitter 12.

It is assumed, that the unaware receiver 20 does not know the authentication scheme and therefore cannot authenticate messages sent from the transmitter 12. However, the unaware receiver 20 remains able to recover the messages. The active adversary 22 knows the authentication scheme, but does not know the secret key. Without the secret key, the active adversary 22 cannot authenticate messages sent from the sender/transmitter 12. A communication system has stealth if it (1) does not significantly impact unaware receivers and (2) is not easily detectable. There is no added privacy to the transmission in the scheme presented in FIG. 1, therefore the unaware receivers are allowed to continue message decoding.

Authentication is a security mechanism and therefore possible attacks to it must be considered. Assuming that the active adversary 22 is aware of the authentication scheme but does not know the secret key, the active adversary 22 may wish to disrupt the authentication process by causing the receiver 14 to either reject authentic messages or accept inauthentic messages. The authentication scheme is defeated when the active adversary 22 is capable of achieving his/her goals above a certain probability $\epsilon$. The active adversary 22 plays an active role and can inject his/her own malicious signals into the wireless medium 18. The tags $t_i$ are commonly dependent on the message so that unauthorized modifications to a message or a tag can be detected. Authentication is useful only when it is difficult for the active adversary 22 to defeat the authentication scheme by creating valid tags for his/her messages (impersonating), modifying messages of the transmitter 12 without receiver's 14 knowledge (tampering), or corrupting the tag so that the receiver 14 cannot verify authenticity (removing).

Since the transmissions are present in random fading environments, it is highly desirable that the authentication scheme be resistant to channel and noise effects. A scheme that is able to continue operation in the midst of interference is determined to be robust.

A reference system is introduced herein as the baseline communications system upon which the novel authentication scheme is built. As an example, single-antenna transceivers transmitting narrowband signals in flat fading channels are considered for the system 10 of the present invention.

Reference System (1) Signal Model

In the reference system, a sender transmits a message to a receiver so that it can be recovered and understood. When the message is to be passed through a random channel the characteristics of which are unknown, the sender codes and modulates the message to protect the same against possible errors.

In the reference system, messages are blocks of M symbols denoted by b={b1, ..., bM}. The message symbols {$b_k$} are assumed to be independent, identically distributed (i.i.d.) random variables. An encoding function $f_e(\cdot)$ encapsulates any coding, modulation, or pulse shaping that may be used. The resulting message signal is $s = f_e(b)$. The transmitted signal is denoted by x={x1, ..., xL}. In the case where the sender merely transmits messages (with no authentication added), x=s. This is referred to as the reference signal and will be compared with the tagged signal of the communication system 10, as presented in the following paragraphs. It is assumed that:

$$E[x_k] = 0 \quad (Eq. 1)$$

$$E|x_k|^2 = \sigma_x^2 = 1 \quad (Eq. 2)$$

$$E|x|^2 = E(|x_1|^2 + \ldots + |x_L|^2) = L \quad (Eq. 3)$$

The message signal also satisfies:

$$E[s_k] = 0 \text{ and} \quad (Eq. 4)$$

$$E|s|^2 = L \quad (Eq. 5)$$

In Eqs. 1-5, the "E" stands for "Expectation", which approximately means "average value". Specifically, in (Eq. 1), the average value of x is 0; in (Eq. 2), the average power of x is 1 (power of x is $x^2$); and in (Eq. 3), the average power of "vector x" is L, e.g., vector is a collection of L instances of x.

(2) Channel Model

A Rayleigh block fading channel model is assumed for the reference system in which different message blocks experience independent fades. The channel for the $i^{th}$ block is $h_i$, which is a complex zero-mean Gaussian variable with variance $\sigma_h^2$. The receiver observes the data block i $$y_i = h_i x_i + \omega_i \quad (Eq. 6)$$

wherein $\omega = \{\omega_i, \ldots, \omega_L\}$ and $\omega_k \sim N(0, \sigma_\omega^2)$ is white Gaussian noise.

The average signal-to-noise ratio (SNR) is $\bar{\gamma} = \sigma_h^2/\sigma_\omega^2$, (Eq. 7)

and the SNR γ experienced by each block γ is Rayleigh distributed with density $$p(\gamma) = \frac{1}{\bar{\gamma}} e^{\frac{-\gamma}{\bar{\gamma}}} \quad (Eq. 8)$$

When the SNR $\gamma_i$ falls below a certain threshold, for example $\gamma_i < \gamma^0$, the $i^{th}$ message block becomes unacceptably corrupted. The outage probability $P_{out}$ is the fraction of time that this occurs, and is fixed by setting $\bar{\gamma}$ $$P_{out} = \int_0^{\gamma^0} p(\gamma) d\gamma = 1 - e^{\frac{-\gamma^0}{\bar{\gamma}}} \quad (Eq. 9)$$

$$\bar{\gamma} = \frac{-\gamma^0}{\ln(1 - P_{out})} \quad (Eq. 10)$$

(3) Channel Estimation

Figure 2:
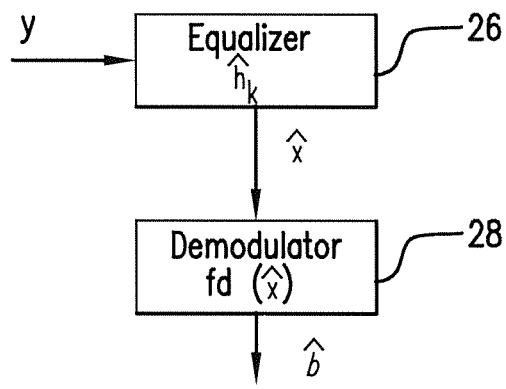
FIG. 2 is a schematic scheme for message recovery for the unaware receiver.

A block diagram of the unaware receiver in the reference system is present in FIG. 2.

It is assumed that the transmitting channel is constant for the duration of the block i. While this may not be strictly true, it is a reasonable assumption for slow fading channels. Pilot symbols are typically used to aid in channel estimation, and they may be inserted in the middle of each block i. For the pilot symbols p and their observations $y_p$, the MMSE channel estimate ĥ is calculated in the equalizer 26 as $$\hat{h} = \frac{1}{|p|^2} p^H y_p \quad (Eq. 11)$$

where $(\cdot)^H$ is the Hermitian transpose.

It is assumed that $$\sigma_p^2 = E|p_k|^2 = \sigma_x^2 = 1. \quad (Eq. 12)$$

(4) Message Recovery

The unaware receiver 20 of FIG. 1 may use its channel estimate ĥ to estimate the $i^{th}$ message signal $$\hat{x}_i = \frac{\hat{h}_i}{|\hat{h}_i|^2} y_i \quad (Eq. 13)$$

It then uses $f_d(\cdot)$ in the demodulator 28 to recover the message symbols $$\hat{b}_i = f_d(\hat{x}_i) \quad (Eq. 14)$$

Communication System 10 with Authentication

The authentication system of the present invention builds upon the reference system introduced in the previous paragraphs. Referring again to FIG. 1, the present communication system 10 uses the tag, e.g. the authentication signal which is superimposed on the message signal at the physical layer 30. The message b to be transmitted may be encoded, modulated, pulse shaped, etc. in the encoding block 32 to generate a message signal $s = f_e(b)$. At the physical layer of the OSI used by the transmitter, a tag signal t is generated in the tag generator 34.

(1) Signal Model

As shown in FIG. 1, the sender 12 transmits the authentication tag t together with the message signal s in order the receiver 14 to verify the sender's identity. The tag is a function of the message $s_i$ and the secret key k $$t_i = g(s_i, k) \tag{Eq. 15}$$

Figure 3:
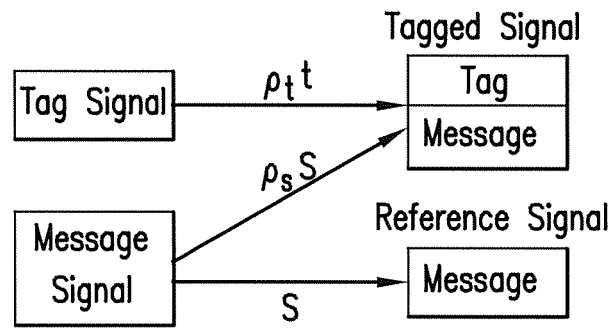
FIG. 3 is a schematic representation of the scheme for constructing the tagged signal to be transmitted to the receiver.

The tag is padded (if necessary) to the message length and transmitted simultaneously. The tagged signal is $x_i$ constructed as shown in FIG. 3.

$$x_i = \rho_s s_i + \rho_t t_i \tag{Eq. 16}$$

where $0 < \rho_s, \rho_t < 1$.

As with the message signal s, it is assumed the tags satisfy $E[t_k] = 0$ and $E|t|^2 = L$. It is also assumed that $E|s^H t| = 0$ so that $\rho_s^2$ and $\rho_t^2$ may be interpreted as allocating energy coefficients between the message s and the tag t. The constraint is imposed $\rho_s^2 + \rho_t^2 = 1$ since the (Eq. 3) must be satisfied for both tagged signal x and reference signal s. In the case where $\rho_s^2 = 1$, the transmitted signal contains no authentication tag and $x_i = s_i$.

The terminology message-to-interference ratio (MIR) and tag-to-noise ratio (TNR) is introduced herein to facilitate further discussion.

$$MIR(\rho_s^2, \gamma_i) = \frac{\rho_s^2 |h_i|^2}{\rho_t^2 |h_i|^2 + \sigma_\omega^2} \tag{Eq. 17}$$

$$= \frac{\rho_s^2 \gamma_i}{\rho_t^2 \gamma_i + 1}$$

and $TNR(\rho_t^2, \gamma_i) = \rho_t^2 |h_i|^2 / \sigma_\omega^2 = \rho_t^2 \gamma_i$ (Eq. 18)

The reference system devotes all the signal energy to the message, i.e., $\rho_s^2 = 1$, $\rho_t^2 = 0$, and therefore $MIR(\rho_s^2, \gamma_i) = \gamma_i$ and $TNR(\rho_t^2, \gamma_i) = 0(-\infty dB)$. While in the subject system with the authentication added, the signal energy is divided between messages s and tag t, so that $0 < \rho_s^2, \rho_t^2 < 1$, $MIR(\rho_s^2, \gamma_i) < \gamma_i$ and $TNR(\rho_t^2, \gamma_i) > -\infty dB$.

Figure 5:
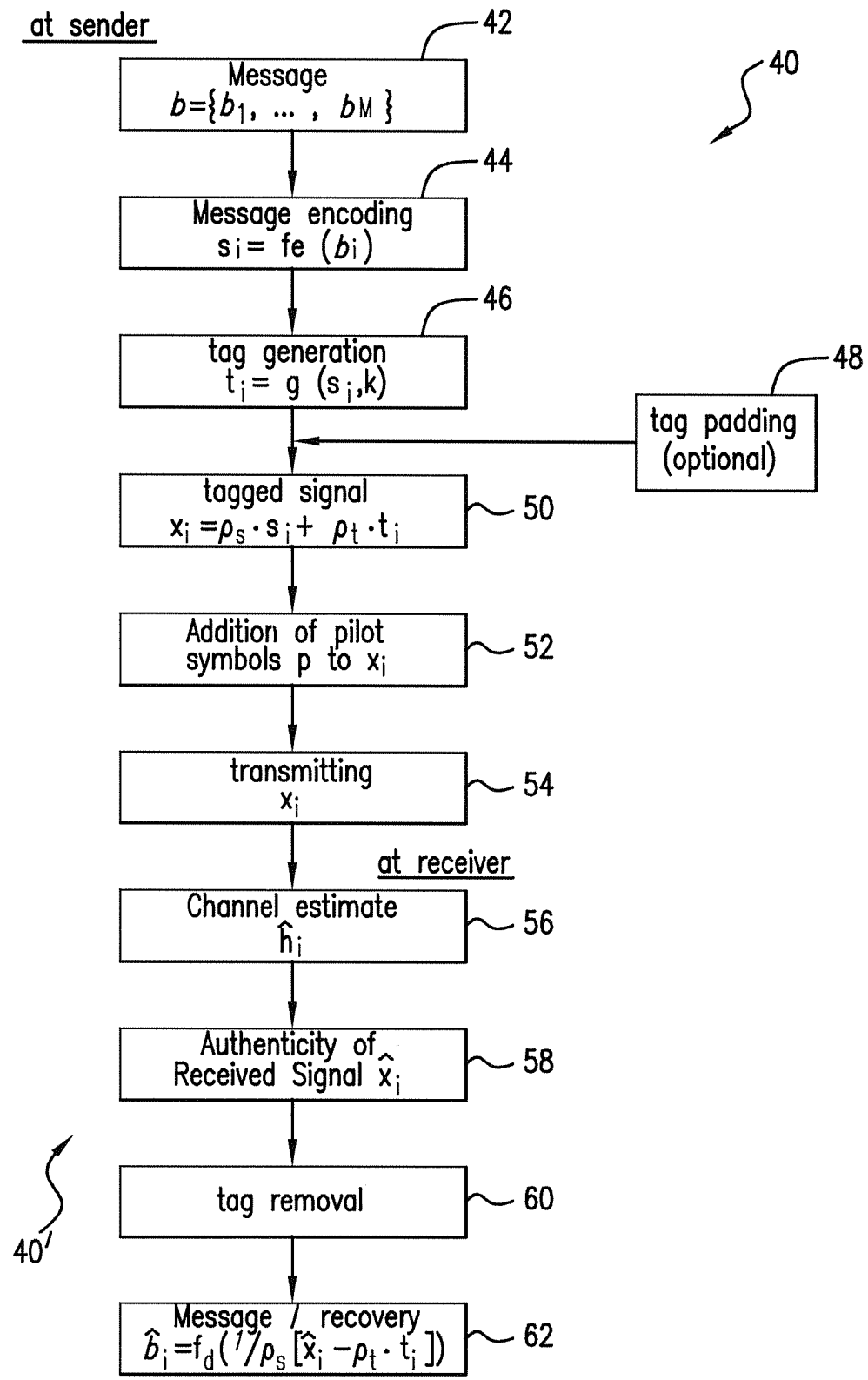
FIG. 5 is a flow chart diagram of the signal transmission and recovery process in the authentication scheme of the present invention.

A processing system (computer) 40 controls the operation of communication system 10 in accordance with the flow chart diagram presented in FIG. 5 which reflects the process underlying the function of the communication system 10. The process is initiated in block 42 "Message $b = \{b_1, \ldots, b_m\}$" where the message to be transmitted is formulated. Upon constructing the message b to be transmitted, the logic flows to block 44 "Message Encoding $s_i = \hat{f}_e(b_i)$" in which the message is encoded. Further, in block 46 "tag generation $t_i = g(s_i, k)$", the tag signal t is generated in accordance with the tag generation function g. The tag signal may be optionally padded to attain the message length in block 48 "tag padding".

Figure 4:
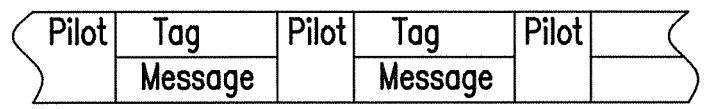
FIG. 4 schematically represents a tagged signal with a TDM pilot symbols placement.

Upon tag signal construction and optional tag padding, the logic flows to block 50 "tagged signal $x_i = \rho_s s_i + \rho_s t_i$" to construct a tagged signal $x_i$ to be transmitted to the receiver 14 through the transmitting channel 16. In block 52 the tagged signal is receiving additional pilot symbols p as shown in FIG. 4. In block 54 "transmitting $x_i$" the tagged signal is transmitted via the transmitting media.

At the receiver, upon receipt of the communication signal $\hat{x}$ (which may be either the transmitted tagged signal x or a signal from the adversary 22), the authentication check and message recovery are performed at the physical layer 30 of the receiver's OSI. The processing system 40' controls the operation of the aware receiver in accordance with the flowchart presented in FIG. 5. It is to be understood, that, depending on application of the communication system 10, the processing systems 40 and 40' may be a single processing system. Similarly, the physical layers 30 and 30' may be the physical layer of the same OSI. The channel model and estimation is performed in block 56, as presented in the following paragraphs:

(2) Channel Model and Estimation

The channel model equivalent to that assumed for the reference system is assumed also for the channel 16 of the subject system 10. Since the energy allocation is different for the system employing the authentication scheme, the pilot symbols p are modified so that decision regions remain valid. The TDM pilot placement in the tagged signal is presented in FIG. 4. Since MIR<SNR for the authentication scheme, the pilot symbols p should be scaled accordingly with $\rho_s$. For amplitude insensitive modulations it has been found that this may not be necessary.

Referring again to FIG. 5, upon channel estimation having been performed in block 56, the processing system 40' commands the communication system, specifically the receiver 14, to "decide" on the authenticity of the received signal in block 58. If in block 58 the authenticity of the signal/sender has been proved, the logic flows to block 60 "tag removal" so that the message $b_i$ may be recovered in block 62 as will be presented in detail in following paragraphs.

(3) Message Recovery

The aware receiver 14 receives and analyzes the received communication signal $\hat{x}$ to make a decision on the authenticity of the signal (sender) in the decision block 36 of FIG. 1, and if the authenticity signal (sender) is valid, the message recovery is performed in the message recovery block 38 of FIG. 1.

As was presented in previous paragraphs regarding the reference system, the unaware receiver (FIG. 2) treats all observations in a similar way. This may be suboptimal when two classes of signals 10 (valid, and malicious) may be observed. Since the aware receiver 14 in the communication system using the authentication scheme knows that a tag may be present, it may remove the tag prior to message recovery, and hence reduce the error, provided that 1) it knows the tag exactly and 2) the tag is present.

The tag is generated from the message and the secret key shared between the sender 12 and aware receiver 14 (Eq. 15). When the message is recovered without error, the aware receiver 14 may generate the tag because he/she has the secret key. Even if the message is recovered with errors, in some cases the tag may be correctly generated if the tag generating function g(·) has some robustness against a message error. In the extreme case, the tag is independent of the message and maximally robust in this sense. However, as will be discussed further, this is inadequate for security. A reasonable compromise may be reached by having the tag depend on the message number i. Because message numbers are known, the aware receiver 14 may be able to generate valid tags using the present authenticity scheme.

The following discussion details how the tag may be detected at the aware receiver 14. If the tag is detected and estimated, then the aware receiver 14 may choose to remove it from the received signal (compare with (Eq. 16))

$$\hat{b}_i^+ = f_d\left(\frac{1}{\rho_s}[\hat{x}_i - \rho_t t_i]\right) \tag{Eq. 19}$$

(4) Authentication

Figure 6:
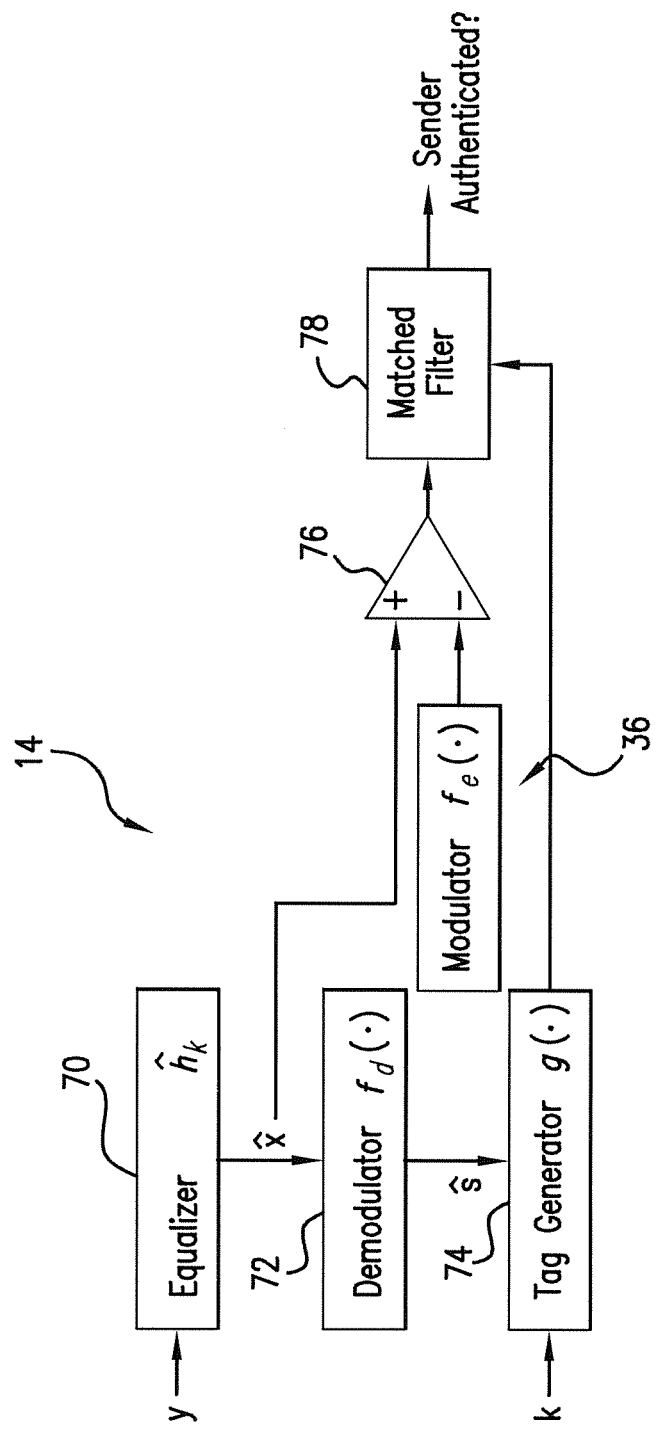
FIG. 6 is a scheme for the authentication and message recovery for the aware receiver in accordance with the present invention.

In addition to recovering the message, the aware receiver 14 decides on the authenticity of the signal. If the receiver decides that the observation demonstrates knowledge of the secret key, then it authenticates the sender, otherwise, the signal is not authenticated. As presented in FIG. 6, after estimating the channel in the equalizer 70, the receiver 14 proceeds to perform message estimation $\hat{x}_i$ to obtain $\hat{s}_i$ by demodulating the estimated tagged signal $\hat{x}_i$ in the demodulator 72. With the secret key k, the receiver 14 may generate the estimated tag $\hat{t}_i$ in the tag generator block 74 using (Eq. 15) and look for it in the residual $r_i$ obtained in the differential amplifier 76

$$\hat{t}_i = g(\hat{s}_i, k) \quad \text{(Eq. 20)}$$

$$r_i = \frac{1}{\rho_t}(\hat{x}_i - \rho_s f_e(\hat{b}_i)) \quad \text{(Eq. 21)}$$

A threshold test is performed using the hypotheses $$H_0: \hat{t}_i \text{ is not present in } r_i \quad \text{(Eq. 22)}$$

$$H_1: \hat{t}_i \text{ is present in } r_i \quad \text{(Eq. 23)}$$

The test statistic $\tau_i$ is obtained by match filtering the residual $r_i$ with the estimated tag $\hat{t}_i$ in the matched filter 78. When perfect channel estimation) ($\hat{h}_i = h_i$) is assumed, then the message recovery ($\hat{s}_i = s_i$), and tag estimation ($\hat{t}_i = t_i$), then the statistic when the tagged signal is received is $$\tau_i | H_1 = t_i^H r_i$$

$$\tau_i | H_1 = t_i^H r_i \quad \text{(Eq. 24)}$$
$$= |t_i|^2 + \frac{\hat{h}_i}{\rho_t |\hat{h}_i|^2} t_i^H \omega$$
$$= |t_i|^2 + v_i$$

where, conditioned on $t_i$, the $v_i$ is a zero-mean Gaussian variable with variance $\sigma_{v_i}^2 = L\sigma_\omega^2/\rho_t^2 |h_i|^2 = L/\rho_t^2 \gamma_i$.

When the reference signal is received, the statistic is $$\tau_i | H_0 = \left(\frac{1-\rho_s}{\rho_t}\right) t_i^H s_i + \frac{\hat{h}_i}{\rho_t |\hat{h}_i|^2} t_i^H \omega \quad \text{(Eq. 25)}$$
$$= \left(\frac{1-\rho_s}{\rho_t}\right) t_i^H s_i + v_i$$

and $E[\tau_i | H_0] = 0$ since $E[s_i^H t_i] = 0$ is assumed.

The decision of authenticity for the $i^{th}$ block $\delta_i$ is decided according to $$\delta_i = \begin{cases} 0 & \tau_i \leq \tau_i^0 \\ 1 & \tau_i \geq \tau_i^0 \end{cases} \quad \text{(Eq. 26)}$$

The threshold $\tau_0$ of this test is determined for a false alarm probability $\alpha$ according to the distribution of $(\tau_i | H_0)$ $$\tau_i^0 = \underset{\tau}{\operatorname{argmin}} \, \Phi(\tau/\sigma_{v_i}) \geq 1 - \alpha \quad \text{(Eq. 27)}$$

where $\Phi(\cdot)$ is the standard Gaussian cumulative distribution function, and $$\sigma_{v_i}^2 \approx L|\hat{h}|^2/\rho_t^2 \sigma_\omega^2. \quad \text{(Eq. 28)}$$

The probability of detection of the $i^{th}$ tag with SNR $\gamma_i$ is $$P_i = 1 - \Phi((\tau_i^0 - L)/\sigma_{v_i}) \quad \text{(Eq. 29)}$$

and the probability of detection of a randomly chosen tag with a random channel realization is $$P = \int P_i p(\gamma) d\gamma \quad \text{(Eq. 30)}$$

where $p(\gamma)$ is the probability density of $\gamma$ given in (Eq. 8).

Examination of how the authentication scheme proposed in previous paragraphs achieves the properties of stealth, robustness, and security follows:

Stealth

There are two aspects of a stealthy scheme. First, it should be covert, e.g. the presence of the scheme should not be easily detectable or be obvious. Second, it should be unobtrusive, e.g. it should not have a noticeable effect on the unaware receivers' ability to recover messages.

(1) Covertness

Analysis has been performed on how the unaware receiver may decide if the observed signal is anomalous. By definition, an anomalous signal has characteristics that are deviant from the reference signal. For example, signals are often constrained to occupy a certain frequency band. If a signal "leaks out" of its allocated band then the receiver may identify it as anomalous. Therefore the tagged signal should obey the same bandwidth constraints as the reference signal. The wavelet basis gives a simple way to control the bandwidth of the tag.

Figure 7:
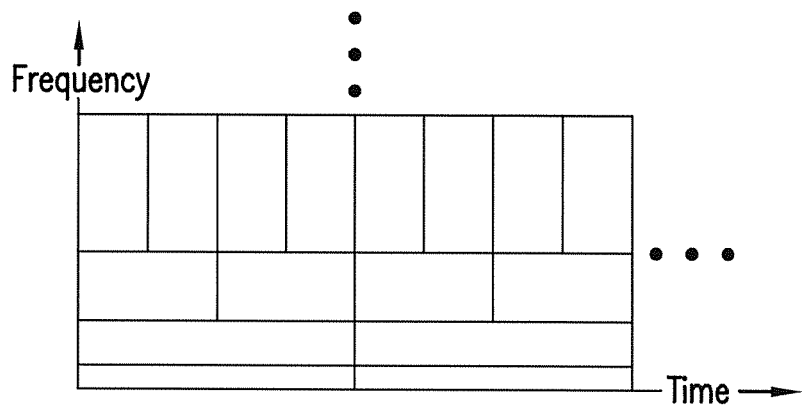
FIG. 7 is a diagram representing wavelet tiling of the time frequency plane.
Figure 8:
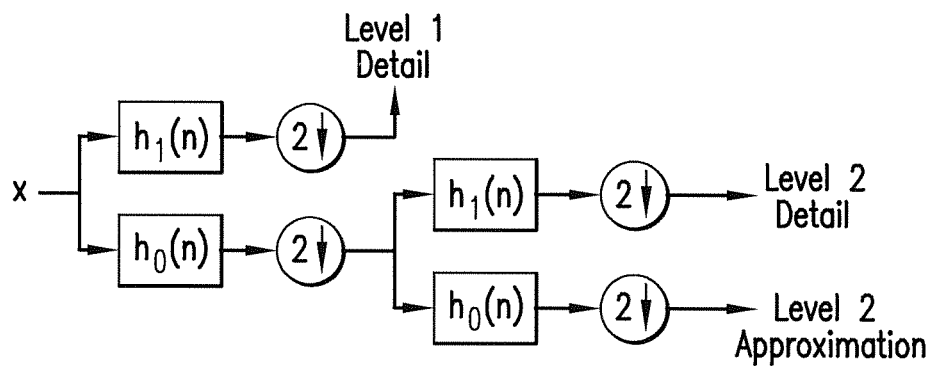
FIG. 8 is a block diagram of the wavelet analysis filter bank.

The wavelet transform gives a constant-Q tiling of the time-frequency plane, where every tile has bandwidth with constant proportion to the others. FIG. 7 illustrates the concept. Considering the sampled signal $x = \{x_1, x_2, \ldots, x_L\}$, the wavelet transform passes the signal through two filters simultaneously, one high-pass $h_1[\cdot]$ filter and one low-pass $h_0[\cdot]$ filter, and then downsamples the outputs by 2, as shown in FIG. 8.

The downsampled output of the high-pass filter are the level 1 detail coefficients, and downsampled output of the low-pass filter are level 1 approximation coefficients. The filter and downsampling is repeated with the approximation coefficients to yield additional levels of detail and approximation coefficients. Further analysis of the approximation coefficients is a characteristic of the wavelet transform and provides a multiresolution signal representation.

Figure 9:
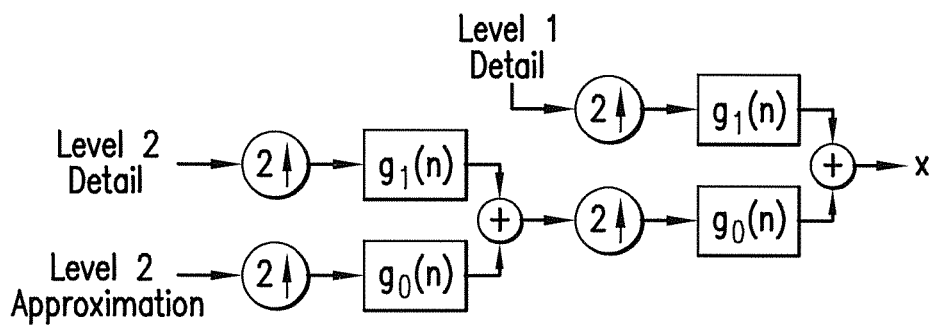
FIG. 9 is a block diagram of the wavelet synthesis filter bank.

The coefficient level is referred to as the scale, and it is noted that large scales correspond to low frequencies. For a signal with small bandwidth, most of the energy will reside in the large scale coefficients. For a signal with large bandwidth however, energy will be spread across the smaller scales as well. Thus for covertness the tag energy is placed only in the appropriate scales depending on the signal. The tag signal may be synthesized from the coefficients by unsampling by 2 and filtering with impulse responses $g_1[n] = h_1[-n]$ and $g_0[n] = h_0[-n]$ as shown in FIG. 9.

The receiver 14 may also flag the signal as anomalous if the noise statistics are significantly different from what is expected. Goodness-of-fit tests such as the Kolmogorov-Smirnov or Lilliefors tests provide a well-known class of anomaly detection algorithms. All such tests give decisions with certain false alarm probabilities. Therefore, for a scheme to be covert, the estimated noise should be able to pass these goodness-of-fit tests without a significantly higher rate of alarm.

Noise is generally assumed to be within a family of distributions with unknown parameters that can be estimated from the signal. It is within these unknown parameters that the authentication tags are covertly placed. For example, if the tag is a Gaussian distributed signal, the residual is a sum of two Gaussians variables and hence distribution tests are insufficient to distinguish its presence.

Next, the effect of tag energy on detectability is considered. For a simple experiment, the effects of the channel were ignored, and it is supposed that the tag symbol $t_k$ is two bits and may assume one of the values {−1.51, −0.453, 0.453, 1.51} with respective probabilities {0.163, 0.327, 0.327, 0.163}, which is the MMSE (Minimum Mean Square Error) four-level quantizer for a Gaussian random variable with zero mean and unit variance.

The tag is observed in AWGN (Additive White Gaussian Noise): $y_k = t_k + \omega_k$. Let the tag to noise ratio (TNR) be defined as $\sigma_t^2/\sigma_\omega^2$ where $\sigma_t^2 = E|t_k|^2$.

Figure 10:
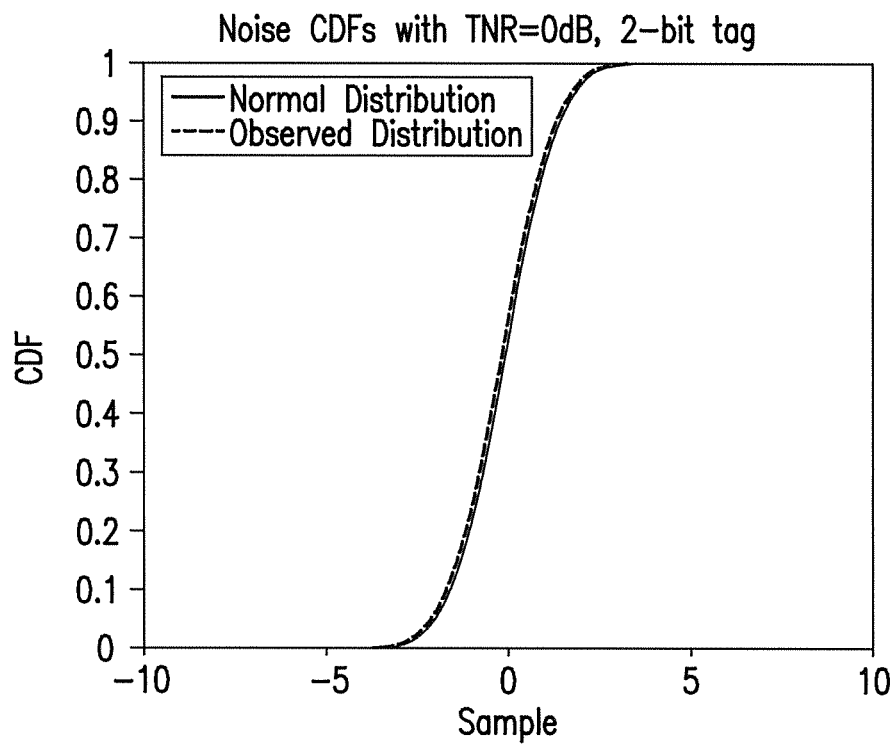
FIG. 10 is a graphical diagram representing cumulative distribution functions for two bit tag when TNR=0 Db.

The receiver 14 tests to see if the observation is Gaussian or not by using the Lilliefors test. This goodness of fit test compares the empirical cumulative distribution function (CDF) with the normal CDF with mean and variance estimated from the observations. FIG. 10 shows the empirical versus normal CDFs when the 1000 two-bit i.i.d. tag symbols are drawn and observed with TNR=0 dB. The Lilliefors test at significance level α=0.01 is unable to distinguish between the CDFs and indicates that the observation is not anomalous.

Figure 11:
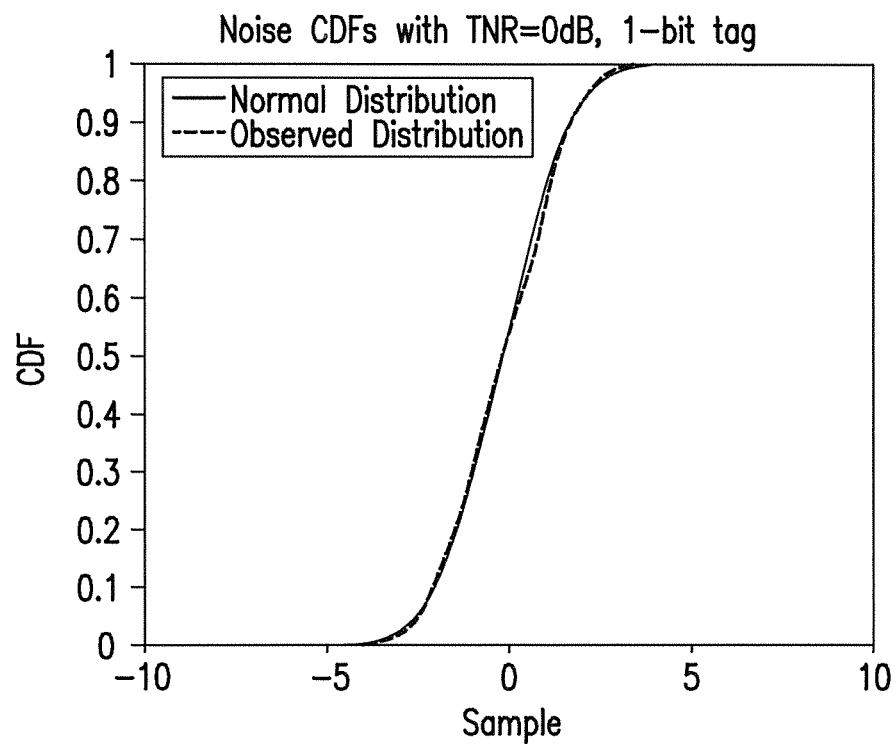
FIG. 11 is a graphical diagram representative of cumulative distribution functions for binary 1 bit tag when TNR=0 Db.
Figure 12:
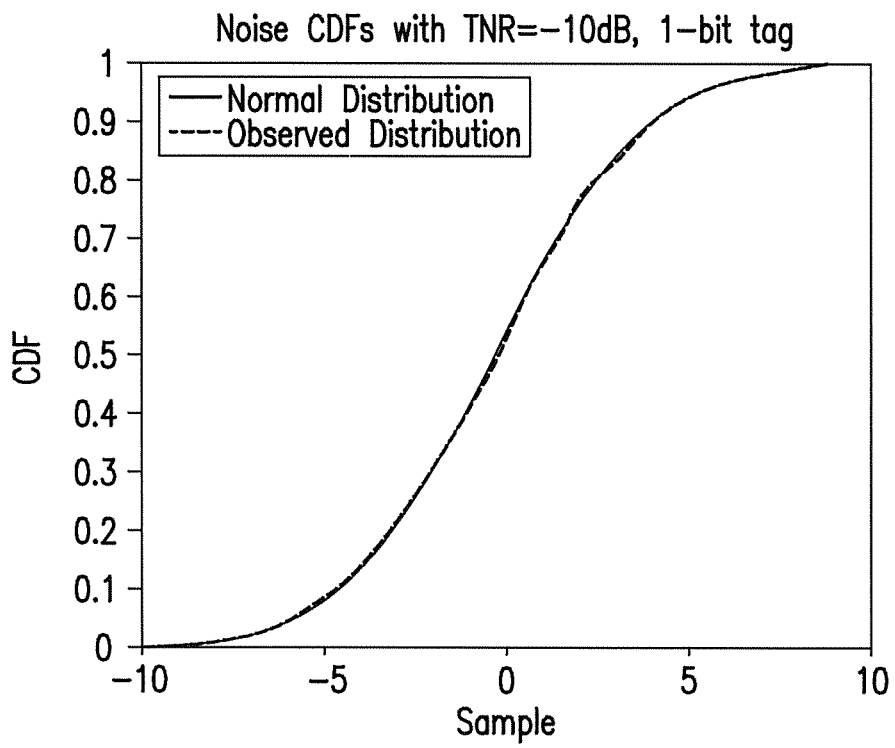
FIG. 12 is a graphical diagram representative of a cumulative distribution functions for binary 1 bit tag when TNR=−10 Db.

Suppose that each tag symbol is represented by one of two equiprobable and polar values $\pm\sigma_t$. FIG. 11 shows the empirical versus normal CDFs when the tag has one-bit symbols and TNR-0 dB. In this case, the Lilliefors test flags the observation as anomalous with significance level α=0.01. However, when the TNR is lowered to −10 dB in FIG. 12, the observed CDF becomes indistinguishable from the normal distribution. These examples demonstrate that the covertness may be improved by transmitting the tag at low power or by making the tag follow a noise-like distribution.

(2) Impact on the Unaware Receiver

When the tag is indistinguishable from noise, it may be treated as noise without significant loss of precision. It is now considered how the outage probability increases when the tag energy increases. With tagged signals, an outage occurs whenever the MIR falls below $\gamma^0$ (SNR threshold defined in previous paragraphs), and hence the outage probability becomes $$P_{out}^m = 1 - e^{-\gamma^m/\bar{\gamma}} \leq P_{out} \quad \text{(Eq. 31)}$$

where $\gamma^m$ satisfies $\gamma^0 = \text{MIR}(\rho_s^2 \gamma^m)$.

Figure 13:
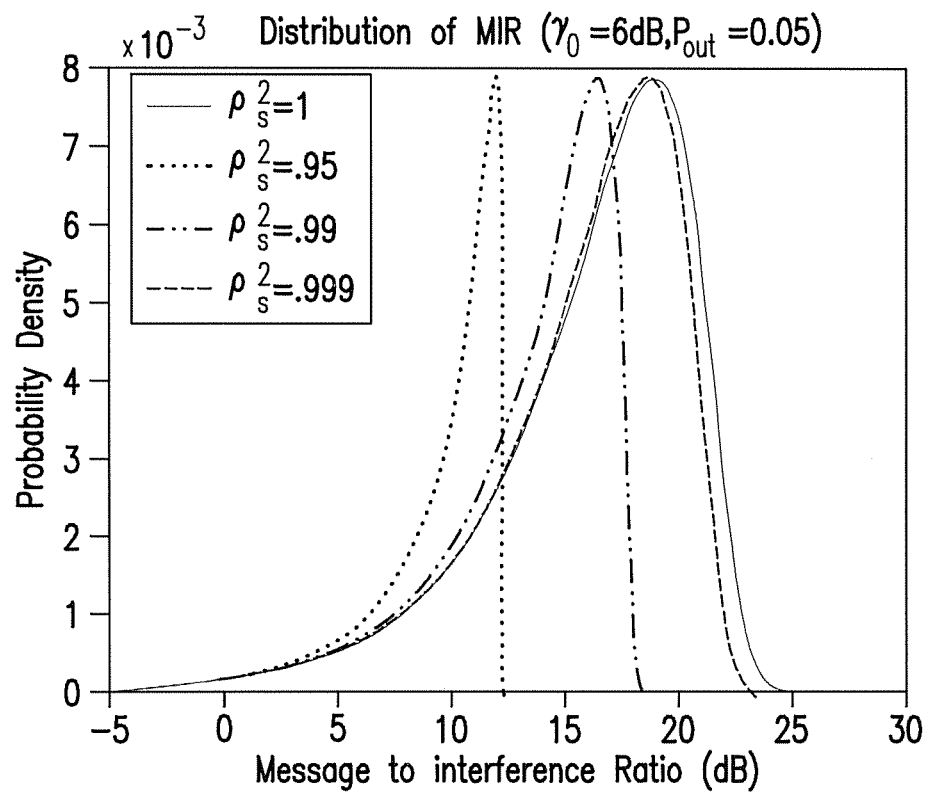
FIG. 13 is a graphical diagram representative of a probability density of message to interference ratios for tagged signals in Rayleigh fading channel.

Suppose that $P_{out}$=0.05. FIG. 13 shows the probability density of the MIR for different $\rho_s^2$ when $\gamma^0$=6 dB. As power is allocated away from the message, lower SNRs become more probable, leading to more frequent outages.

Figure 14:
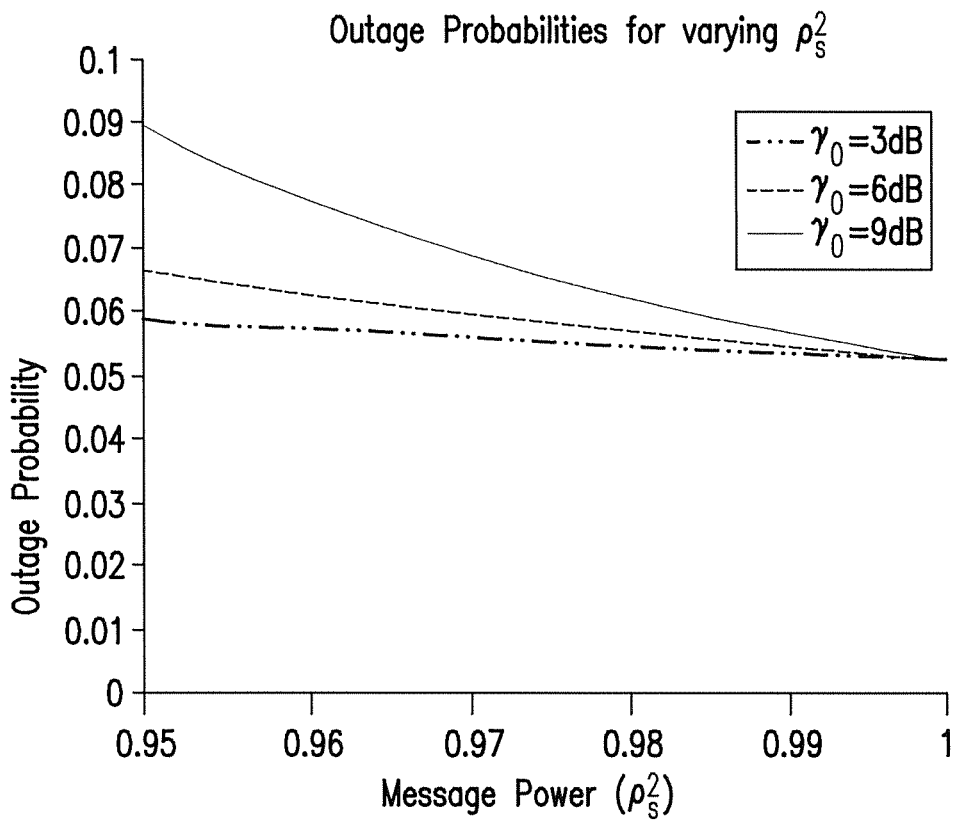
FIG. 14 is a graphical diagram representative of outage probabilities for various $\gamma^0$.

FIG. 14 shows the outage probabilities as a function of $\rho_s^2$ for $\gamma^0$=3, 6, and 9 dB. The outage probability is less sensitive to changes in $\rho_s^2$ for low $\gamma^0$. In any case, a high message energy allocation keeps the outage probability close to $P_{out}$.

Thus though the authentication is covert at any power, when it is distributed as noise, at high power it has a large impact on the unaware receiver. It is only for low tag power that the impact is small, regardless of how covert it is. Hence the most important parameter for stealth is a small $\rho_t^2$ which leads to a covert signal with low TNR and high MIR. The potential difficulty of detecting a low power tag is overcome with coding as presented in following paragraphs.

Robustness

A robust scheme is resistant to channel and noise effects and may continue the authentication process in the midst of interference. With the channel assumptions as presented supra, each block suffers a random fade which affects the SNR $\gamma_i$. The present authentication process fixes the false alarm probability at α but the detection probability varies with the SNR. Additive noise and jamming signals also decrease the SNR. Thus the facing channel combined with noise and other interference present difficulties to the authentication.

One possible method of improving robustness is to increase the power of the transmission signal to raise the average SNR $\bar{\gamma}$. This lowers the probability of unsuitably low SNRs, however such is not always feasible. Alternatively, the authentication process may be extended to consider a sequence of multiple received tagged signal blocks together instead of each tagged signal block $\delta_i$ separately. Since a Rayleigh block fading channel model is assumed, each block experiences independent fades; and, conditioned on the authenticity of the signal, the authentication decisions are independent events as well.

Let $x = \Sigma_i \delta_i$ to tally the number of detected tags in K blocks. When no tag is sent, the probability of falsely detecting fewer than k tags is $$p(x < k|H_0) = \sum_{i=0}^{k-1} B(i; K, \alpha) \quad \text{(Eq. 32)}$$

where B(x; n, p) is the binomial probability mass function of obtaining exactly x successes in n identical and independent trials with probability of success p. For the extended test, x is compared with a threshold $k_0$ that is set so that the false alarm probability does not exceed the new false alarm probability $\alpha_K$ $$k_0 = \arg\max_j \left[ \sum_{i=0}^{j-1} B(i; K, \alpha) < \alpha_K \right] \quad \text{(Eq. 33)}$$

The Neyman-Pearson test gives the probability of deciding $H_1$ as:

$$\delta_K = \begin{cases} 1 & x < k_0 \\ \pi & x = k_0 \\ 0 & x > k_0 \end{cases} \quad \text{(Eq. 34)}$$

where p is the randomization of the detection rule and is given by $$\pi = \frac{\alpha_K - p(x < k_0|H_0)}{p(x = k_0|H_0)} \quad \text{(Eq. 35)}$$

For a randomly selected group of K tagged signal blocks, the probability of correctly deciding $H_1$ is simply $$p(x > k|H_1) = (1-\pi)B(k_0; K, P) + \sum_{i=k+1}^{K} B(i; K, P) \quad \text{(Eq. 36)}$$

where P is the probability of detection for a randomly observed block (Eq. 30).

There is a fundamental tradeoff between robustness and security. When a scheme is made more robust in this manner, more errors are allowed to be made in the tag detection before rejecting an authentic signal. However, this gives the adversary more opportunity to inject malicious blocks that may be accepted as authentic. Security issues are discussed in the following paragraphs.

Security

A secure scheme is defined as a scheme resistant to adversarial attacks. The adversary model is defined and the security of the subject scheme is now examined.

(1) Adversary Model

The adversary 22 in FIG. 1 is an aware receiver and knows the authentication scheme that the sender 12 and receiver 14 are using. However, the adversary 22 does not know the secret key k. The adversary 22 is an active opponent and can transmit his/her own signals that are observable by the receiver 14. However, it is impossible for the adversary 22 to coherently disrupt sender 12's signals. The reason is that any error in estimating the propagation delay, multipath, and possibly mobility between sender 12, receiver 14, and adversary 22 will result in a non-coherent interruption.

Thus, though the adversary 22 may try to modify certain symbols by overpowering the sender 12's signal with malicious signal signal, the adversary 22 will only corrupt the signal incoherently. Hence, the adversary 22 can transmit his/her own blocks, or non-coherently interfere with the sender 12's blocks, but cannot arbitrarily modify sender 12's signals en route in a controlled manner. This is a fundamental restriction at the physical layer that is not present at the higher layers.

To defeat the authentication scheme, the adversary 22 must be able to cause receiver 14 to (a) reject authentic messages or (b) accept inauthentic messages with non-zero probability. In order to succeed with the goal (a), the adversary 22 needs to remove or corrupt the authentication tag, and to succeed with the goal (b), the adversary 22 needs to have his/her malicious block accepted by the receiver 14 due to inability to intelligently alter the sender 12's messages.

(2) Jamming Attacks

One way that adversary 22 may try to remove the authentication tag is through corruption. For practicing this approach, he/she is transmitting to the receiver 14 in an attempt to mask the tag. This signal may be viewed as a degradation in SNR and hence may be combated by increasing the strength of the authentication test.

(3) Replay Attacks

The adversary 22 may also be interested in having the receiver 14 accept inauthentic messages, i.e. the messages that someone other than sender 12 transmits. For this, the adversary 22 may simply replay a message that the sender 12 transmitted in the past—this is defined as a reply attack. However, since the tag is assumed to be time-varying, the receiver 14 will not accept it.

(4) Impersonation Attacks

The adversary 22 may try to create his/her own messages and tags that he/she hopes will be accepted by the aware receiver 14. In this way, the adversary 22 tries to impersonate the sender 12. The probability that the malicious message will be authenticated depends on the authentication performed by the aware receiver 14. When the authentication considers multiple blocks and requires a certain number of tags to be verified, the adversary 22 may be able to have his/her block accepted even if it doesn't contain a valid tag. Suppose that the aware receiver 14 requires at least k tag detections in K blocks to authenticate. When only sender 12 transmits to the aware receiver 14, the detection probability is $\Sigma_{i=k}^{K} B(i;K,P)$. However, when the adversary 22 inserts his/her own block, a tag is detected in the block with probability $\alpha$. The new detection probability is then $$\Sigma_{i=k}^{K} B(i;K-1,P) + \alpha B(k-1;K-1,P). \quad \text{(Eq. 37)}$$

Realistically, there would be additional safeguards at layers of the OSI higher than the PHY to prevent malicious messages from being accepted between the authentic messages. For example, the authentication requires multiple blocks only when a single block is insufficient to provide an accurate decision. This case indicates a noisy channel, and hence the messages would be coded across multiple blocks as well, for example by using an erasure code. In such cases, malicious blocks will be either detected or discarded, but will not have an impact on the decoded messages.

However, in the present authentication scheme each message is required to have a valid tag. Since the adversary 22 does not have the secret key, he/she must generate valid tags based on his/her observations. In other words, he/she must predict future tags. Tag prediction may be resisted in the present authentication scheme by having a secret key k with reasonable entropy and a suitable tag generation function $g(\cdot)$. For example, $g(\cdot)$ may be a pseudo-random number generator seeded by k. Then the output of the tag generator appears random and difficult to predict. Alternatively, subsets of the tag generator output may be used as the tags.

The adversary 22 may take a more direct approach and attempt to gain information about the secret key. In the worst case, he/she may be able to completely recover k and impersonate the sender 12 at will. With a K-bit secret key, one of up to $2^K$ distinct tags will be assigned to a given message. If the tags are observed without noise and the observation length is sufficiently large, the key may be recovered without error.

However, the tags are always observed with noise, and the key recovery becomes probabilistic. Intuitively, the key may be recovered with high probability when the noise is minimal, but with lower probability when the noise is more powerful. This is one of the fundamental differences between the subject authentication scheme and prior art developments in authentication in that the present authentication scheme capitalizes on the noise to hide the authentication tags and protect the secret key from discovery.

To state the secret key recovery problem, equivocation is introduced herein as the central measure for the secret key security. Equivocation is the entropy of the key given all past observations:

$$\Delta_i \triangleq H(k|y_i, y_{i-1}, \ldots y_1) \quad \text{(Eq. 38)}$$

When there is no noise and sufficiently many blocks are observed, then the $\Delta_i=0, i<\infty$ and key recovery is guaranteed in finite time. In the presence of noise, however, the equivocation is non-zero for finitely many observations, and hence the probability of key recovery is strictly less than unity. As the noise becomes more powerful, the equivocation is near its upper bound $$\Delta_i \approx (k), i < \infty \quad \text{(Eq. 39)}$$

and approaches zero very slowly. Assuming uniformly distributed secret keys, the probability of the secret key recovery is about $2^{-K}$ for finite I, the same as a random guess.

To better understand the equivocation present in the subject communication system, the example introduced in the previous paragraphs regarding the system covertness is revisited to examine the equivocation of a tag symbol. Each tag symbol is represented by one of two equiprobable and polar values $\pm\sigma_i$ and is observed in AWGN: $y_k = t_k + \omega_k$. The TNR is $\sigma_i^2/\sigma_i^2$. The adversary 22 may determine which tag symbol was sent by performing a sign test on $y_k$. The probability of error is $\rho_e = \Phi(-\sigma_i/\sigma_\omega)$. and the equivocation of the decision is given by the binary entropy:

$$H(t_k|y_k) = p_e \log_2 \frac{1}{p_e} + (1-p_e)\log_2 \frac{1}{(1-p_e)} \quad \text{(Eq. 40)}$$

Figure 16:
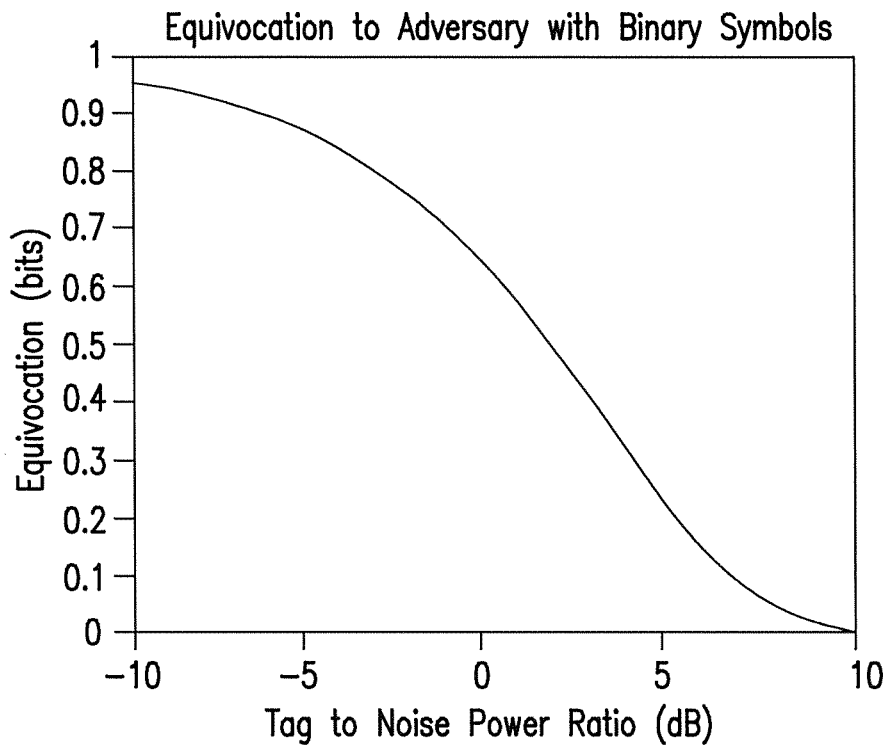
FIG. 16 is a graphical diagram representative of equivocation of binary tag signal to the adversary for varying TNR.

At low TNR the equivocation of the transmitted symbol is quite high as seen in FIG. 16. As the equivocation approaches unity, no information is gained about the tag symbol.

In the attempt to recover the secret key, the adversary 22 may estimate the residual by removing the message from $y_i$. Since the adversary 22 estimates each tag symbol with some non-zero error, his/her search space for the key expands depending on the tag symbol equivocation. A straightforward solution is to compute the tags corresponding to each possible key of $2^K$ keys, then select the key that generates the signal most similar to the residual. This may be viewed as a brute force method. However, with a sufficiently high K this is impractical since the adversary 22 may run into computation and memory restraints. The remaining alternative is to attempt inversion of $g(\cdot)$.

When the image of $g(\cdot)$ is observed with sufficient length and without noise, the adversary 22 may be able to recover the key in a reasonable time. This may be a concern in the layers higher than the PHY. However, the $g(\cdot)$ is used in the subject authentication scheme in the physical layer (PHY) where the tag is never known without error. The adversary 22 has no choice but to spread its key recovery efforts among the probable tags. For binary tag symbols, the number of possibly transmitted words doubles as each tag symbol is estimated. The receiver 14 must prune the possibilities to consider only the more probable tags, otherwise all possible tags would be considered.

The set of probable tags depends on the tag symbol error probability $p_e$. When the $p_e$ is small, the paths that include few errors should be considered more probable, while the opposite is true when the $p_e$ is large. For example, suppose that the receiver estimates the tag sequence 000. When the $p_e$ is small, the most likely transmitted sequence is 000, and the second most likely transmitted sequences are {001, 010, 100}. The least likely transmitted sequence is 111. If a length-L observation is considered and paths with k or fewer errors are chosen, the search space is expanded by $\Sigma_{i=}^{k}\binom{L}{i}$, which is a polynomial factor for fixed k.

Because of the adversary 22's uncertainty in estimation of tag symbols, the search space for the secret key expands significantly. As long as the secret key has sufficient entropy to resist brute force attacks and the tag has low power, it becomes very difficult for the adversary 22 to recover the key.

Tradeoffs

An example system where the message symbols are i.i.d. uniform discrete random variables has been analyzed. In the system examined, the message was coded, a rate 1/2 Hamming code, modulated with BPSK, and a root raised cosine pulse shaped (with rolloff factor 0.5). The block length L was determined by the coherence time of the channel. A 16-bit pilot sequence was inserted in the block for channel estimation.

The Haar (or equivalently the Daubechies 2) wavelet was used to decompose the BPSK signal prior to pulse shaping. One level of wavelet decomposition was applied and all L possible (detail and approximation) coefficients were used to describe the tags. The spectrum was slightly perturbed and managed by pulse shaping. The tag energy was distributed as follows: the $i^{th}$ tag was generated from the L-bit output of a pseudo-random number generator (PRNG) $g(\cdot)$ using k+I as its seed. The L bits were mapped to ±1 so that $E|t^2|=L$. Without loss of generality, k=0 was assumed. The tag was therefore $$t_i = \{g(i)\}_{L\, bits} \quad \text{(Eq. 41)}$$

Over a fading block therefore a constant $TNR=\rho_s^2 \gamma_i$ was obtained for each coefficient.

With the above parameters in place, it is chosen to operate the system with a given power allocation $\rho_s^2$ and to use a detection test with certain false alarm and detection probabilities. To give a preview of the results, $\rho_s^2$ is the major parameter that affects all three properties: stealth, robustness, and security. Stealth and security require low tag energy, while robustness requires the opposite. However, these requirements are able to find common ground when the detection test is chosen in an approximate manner. When a power allocation gives insufficient power to the tag, the authentication probability of a single tag may be unacceptably low. This problem is easily addressed by extending the authentication decision to consider multiple data blocks in the received communication signal instead of analyzing each data block separately.

Stealth

The impact of the scheme on the unaware receiver is analyzed by observing the increase in outage probability and bit error rate (BER). The outage probability is shown in FIG. 14 as a function of $\rho_s^2$ for various minimum SNR $\gamma^0$. The outage probability is fixed at 0.05. When the requirements of the channel are less stringent (higher $\gamma^0$), there is more flexibility in the allocation of power to the tag. For example, when $\gamma^0=9$ dB, 2% of the power may be allocated to the tag without pushing the outage probability over 0.06. However, when $\gamma=6$ or 3 dB, more than 4% or 5% of the power may be allocated to the tag. The outage probability is therefore dependent on power allocation and the SNR requirements with increased sensitivity for stricter requirements.

Figure 15:
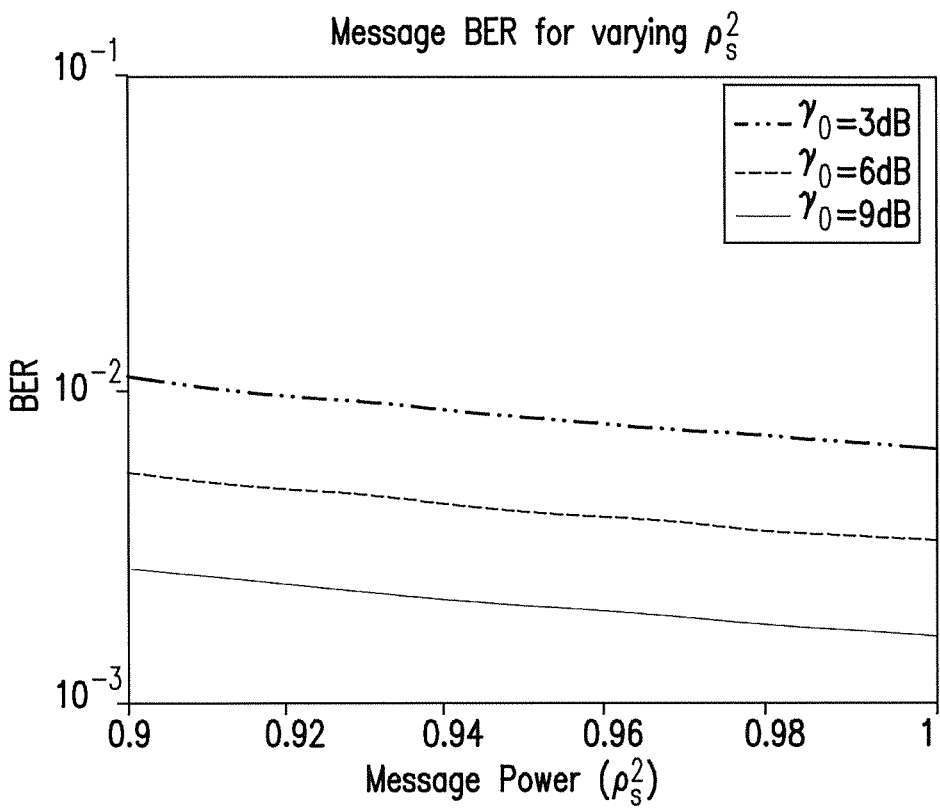
FIG. 15 is a graphical diagram representative of message BER for tagged signals in Rayleigh fading for various $\gamma^0$ with outage probability $p_{out}$=0.05.

The BER is shown in FIG. 15 as a function of $\rho_s^2$ for various minimum SNR $\gamma^0$. The outage probability is fixed at 0.05. The baseline BER is the point where $\rho_s^2=1$, because no power is allocated to the tag. It is noted, that the BER curves are rather flat where $\rho_s^2$ is near 1. This gives the flexibility of choosing from a range of possible power allocations. As discussed in previous paragraphs in reference to the outage probabilities, stricter SNR requirements ($\gamma^0$) restrict the power allocations.

As discussed supra herein, the Lilliefors test is unable to detect anomalous signals for $\rho_s^2$ near 1. Thus the requirements given by the outage probabilities and BER are harmonious and advocate high $\rho_s^2$. Suppose that $\gamma^0=6$ dB and a BER of 0.004 ($\rho_s \geq 0.98$) and an outage probability of 0.055 ($\rho_s \geq 0.985$) may be tolerated. Thus both constraints are satisfied with $\rho_s^2=\max(0.98, 0.985)$, and hence we can safely allocate up to 1.5% of the power to signal the tag while satisfying the constraints of stealth.

Robustness

Figure 17:
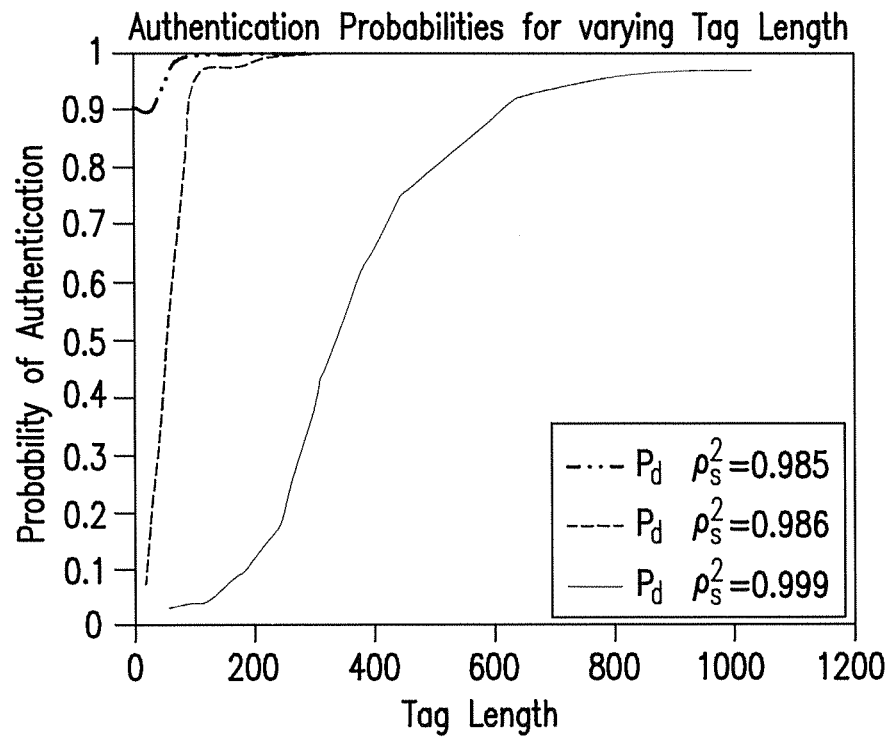
FIG. 17 is a graphical diagram representative of authentication probability for $\rho_s^2 \epsilon \{0.985, 0.995, 0.999\}$ over a single tag with false alarm probability a=0.01.

While stealth requires low tag power, robustness requires sufficient tag energy for reliable detection. The tag energy is dependent on two factors: tag power and tag length. When the tag length exceeds the block length, the authentication decision would consider multiple tags. The effect of tag length on the authentication probability is shown in FIG. 17 for various power allocations $\rho_s^2$. Here we assume that the tag is as long as a single fading block. The minimum SNR is $\gamma^0=6$ dB with outage probability 0.05.

For a fixed $\rho_s^2$, the energy of the tag increases and hence the authentication performance improves with increasing block length. Hence the performance is tied directly with the coherence time of the channel. Consider the situation when $\rho_s^2=0.999$ and the false alarm probability is $\alpha=0.01$. When L=1024 symbols, the tag detection probability is 0.973, while it drops to 0.811 when L=512. Though the channel coherence time is out of our control, the coding across blocks may be performed by authenticating only when at least two tags are detected out of four blocks. With this rule, the new authentication probability is 0.978 and the false alarm probability is 0.0006.

Security

When multiple blocks are used for the authentication, the added robustness gives the adversary more opportunities to pass inauthentic blocks to the aware receiver 14. The tradeoff between robustness and security is fundamental, e.g., by allowing more errors in the authentication process, it gives the adversary 22 a greater opportunity to "sneak in" his/her own messages. However, it is suggested that impersonation attempts of the adversary 22 are futile when messages are coded across blocks. This is usually done in the presence of block fading to mitigate outage effects. Hence message of the adversary 22 will be decoded as part of a larger stream, and will be either corrected or discarded by the decoder t the aware receiver 14. The adversary 22 must therefore be able to convince the aware receiver 14 to accept a stream of tagged messages. This is very difficult when the adversary 22 does not know the secret key.

The security of the scheme is demonstrated by its stealth and the analysis of the system presented supra. For a fixed $\rho_s^2$, the TNR is different for every realization of the channel. When $\bar{\gamma}$=18.9 dB, then $$E[\gamma] = \sqrt{\frac{\pi}{2}} \bar{\gamma} = 19.88 \text{ dB} = 97.$$

The expected (TNR when $\rho_s^2=0.985$) is TNR(0.015,97)=1.6 dB. In FIG. 16, the corresponding equivocation is 0.51 bits/coefficient. For $\rho_s^2=0.995$ and 0.999, the corresponding equivocations are respectively 0.79 and 0.95 bits/coefficient. Since each coefficient contains a single bit of tag information, equivocations near 1 keep adversaries in confusion about the tag, and hence their search space grows by nearly the worst case $2^L$ per block.

Even if assuming that the adversary 22 is able to estimate the tags, he/she still must break the tag generation in order to perform the malicious attacks.

Thus, it may be seen that the subject authentication scheme has two levels of defense: the adversary 22 has difficulty understanding what is being sent when it is stealthy, and once he/she does understand, then the non-trivial task of breaking the tag generation is difficult to accomplish.

Operating Point

The choice of parameters is guided by the relative importance of stealth, robustness, and security. In the example system, it is seen that the stealth requirements are satisfied when $\rho_s^2 \geq 0.985$. If the minimum acceptable) $\rho_s^2=0.985$ is set, then it is seen in FIG. 17 that the authentication is robust to even short coherence times, with authentication probabilities above 0.99 for L>96 bits. The corresponding equivocation for this power allocation is 0.51 bits/coefficient. If the tag generation function is reasonably difficult to break, then this equivocation is acceptable. However, the tags are to be transmitted in near perfect secrecy, the equivocation is to be increased by increasing $\rho_s^2$.

Suppose that $\rho_s^2=0.999$ is set. In this case, the tag has minimal impact on BER and outage probability, and the equivocation rises to 0.95 bits/coefficient. However, the tag detection probability over a single tag is decreased depending on L. For all but long coherence times (L>1024), the authentication probability should be increased by using multiple blocks for the decision. When the coherence time is short, many blocks may be necessary: in the case where L=256, the authentication probability of 0.99 requires that at least 1 tag be detected out of 23 blocks. This situation is not usually vulnerable to impersonation attacks because of message coding across multiple blocks. A decision is then made after 256*23=5888 bits in comparison to after 1024 bits in the long coherence time situation.

A natural question that may arise is how well the scheme works in fast (time-varying) fading channels. To analyze this issue, another channel model and the associated channel estimation algorithm are introduced. It is found that the aware receiver 14 is able to even improve the message recovery by treating the authentication tag as pilot symbols, and the necessary changes are detailed infra herein.

Channel Model

Instead of the Rayleigh block fading channel model used in previous discussion, a Gauss-Markov channel model may be alternatively employed as an example to describe fast fading. Rather than assuming a constant fade for each block of symbols, each symbol suffers a different but correlated fade. The channel for the $k^{th}$ symbol is $$h_k a h_{k-1} + u_k \quad \text{(Eq. 42)}$$

where $\alpha$ is the fading correlation coefficient and $u_k \sim N(0, \sigma_u^2)$, and where $\sigma_u^2 = (1-\alpha^2)\sigma_h^2$.

The fading correlation coefficient characterizes how quickly the channel fades: large values (close to unity) model slow fading channels, while small values model fast fading channels. After passing through the channel, the aware receiver 14 observes the signal $\gamma$:

$$\gamma_k = h_k x_k + \omega_k \quad \text{(Eq. 43)}$$

$$y_i = h_i x_i + \omega_i \quad \text{(Eq. 44)}$$

where $\omega_k \sim N(0, \sigma_w^2)$ is white Gaussian noise. It is noted that the message in blocks are still considered but now the channel is a vector $h=\{h_1, \ldots, h_L\}$. The average SNR is $\bar{\gamma} = \sigma_h^2/\sigma_\omega^2$.

Channel Estimation

Due to modeling the channel as an AR-1 process, the Kalman filter may be used to provide the linear MMSE channel estimate. Periodic pilot symbols are used to aid channel estimation, however in the Gauss-Markov channel they are inserted more frequently because the channel is fast fading. $T_p$ pilot symbols are used which precede every cluster of $T_d$ data (i.e., message and tag) symbols and $T=T_p+T_d$. Thus pilots are inserted into x such that $\{x_k\}|_{k \bmod T < T_p}$ are pilots and the rest are data, as shown in FIG. 4.

The channel estimation is slightly different depending on the situation, e.g. (a) if the tag presence is unknown, or (b) if it is assumed to be present. The presence of the tag may be unknown, by the unaware receiver, if the aware receiver is not provided with the secret key, or the aware receiver is not able to verify tag presence. Then the tag may be used as extra information to estimate the channel.

Tag Presence Unknown

The equations for channel state (Eq. 42) and observation (Eq. 4) are used to construct the filter. The filter educates or trains itself to make increasingly accurate estimates while it is receiving the pilot symbols $p_k$. The following filter update equations during the training period (k mod $T<T_p$) may be used:

$$[\text{Kalman Gain}] \; K_k = \frac{(\alpha^2 M_{k-1} + \sigma_u^2)p_k}{\sigma_\omega^2 + (\alpha^2 M_{k-1} + \sigma_u^2)\sigma_p^2} \quad (\text{Eq. 45})$$

$$[\text{Estimate}] \; \hat{h}_k = a\hat{h}_{k-1} + K_k(y_k - a\hat{h}_{k-1}\rho_k) \quad (\text{Eq. 46})$$

$$[\text{MMSE}] \; M_k = (1 - K_{k\rho_k})(\alpha^2 M_{k-1} + \sigma_u^2) \quad (\text{Eq. 47})$$

When the training period is over, the filter estimates the channel based on the AR-1 model (Eq. 42). The update equations during the data period ($k \bmod T \geq T_p$) are:

$$[\text{Channel Estimate}] \hat{h}_k = a\hat{h}_{k-1} \quad (\text{Eq. 48})$$

$$[\text{MMSE}] M_k = a^2 M_{k-1} + \sigma_u^2, \quad (\text{Eq. 49})$$

wherein the channel estimate for the $i^{th}$ block is the vector $\hat{h}_i$.

Tag is Assumed Present

The aware receiver 14 with the secret key may potentially obtain a better channel estimate than the unaware receiver 20, since for the authentication, the authentication tags must be known at the receiver. Therefore they may be used for channel estimation, in exactly the way as pilot symbols, provided that the tag is indeed present. The receiver who uses this information operates as follows: as soon as the estimated tag $\hat{t}_i$ is generated using (Eq. 20), it is used to track the channel constantly during data symbol reception. Because the channel estimation does not change during the pilot symbol reception, equations (Eq. 45)-(Eq. 47) do not change.

When the data symbols are received, however, the Kalman filter continues to update and track the signal by using the tag which it decides is present. Assuming that the estimated tag is present, the observation is rewritten as:

$$y_k = \rho_s h_k s_k + \rho_t h_k t_k + \omega_k \quad (\text{Eq. 50})$$

$$= \rho_t h_k t_k + \upsilon_k \quad (\text{Eq. 51})$$

Note that $\upsilon_k \sim N(0, \rho_s^2 \sigma_h^2 + \sigma_\omega^2)$. Then the update equations during the training period ($k \bmod T < T_p$) are:

$$[\text{Kalman Gain}] \; K_k = \frac{(\alpha^2 M_{k-1} + \sigma_u^2)\rho_t t_k}{\sigma_\upsilon^2 + (\alpha^2 M_{k-1} + \sigma_u^2)\rho_t^2} \quad (\text{Eq. 52})$$

$$[\text{Estimate}] \; \hat{h}_k = a\hat{h}_{k-1} + K_k(y_k - a\rho_t \hat{h}_{k-1} t_k) \quad (\text{Eq. 53})$$

$$[\text{MMSE}] \; M_k = (1 - \rho_t K_k t_k) \cdot (\alpha^2 M_{k-1} + \sigma_u^2) \quad (\text{Eq. 54})$$

Comparison of equations (Eq. 52)-(Eq. 54) with (Eq. 45)-(Eq. 47) reveals that $\sigma_\omega^2$ is replaced with $\sigma_\upsilon^2$ and $p_k$ is replaced with $p_t t_k$. The channel estimate that assumes the tag is present for the $i^{th}$ block is the vector $\hat{h}_i$.

Message Recovery (1) Tag Presence Unknown

The receiver uses its channel estimate h to estimate the message signal $$x_k = \frac{\hat{h}_k}{|\hat{h}_k|^2} y_k \quad (\text{Eq. 55})$$

and uses equations (Eq. 10) to recover the message symbols.

(2) Tag Assumed Present

If the receiver decides that the tag is present, not only may it remove it prior to message estimation, it may also use the improved channel estimate $\hat{h}_i^+$. The estimated message signal is then $$x_k = \frac{1}{\rho_s}\left(\frac{\hat{h}_k^+}{|\hat{h}_k^+|^2} y_k - \rho_t t_k\right) \quad (\text{Eq. 56})$$

and uses equation (Eq. 10) to recover the message symbols.

Authentication

The authentication process remains unchanged. The channel estimate used in the tag detection should not use the tag as pilot symbols.

An example system was tested where messages were modulated with BPSK with a root raised cosine pulse shape (rolloff $\alpha=0.5$). The message symbols were not coded. The length of the transmitted blocks was set to be L=4096 bits. Two pilot symbols preceded every cluster of 8 message and tag symbols ($T_p=2$, $T_d+8$). The tag was generated with a PRNG as in Eq. 41. The message and tag were then modulated, scaled with $\rho_s^2=0.995$, and transmitted through the time-varying channel with $\alpha=0.995$.

Figure 18:
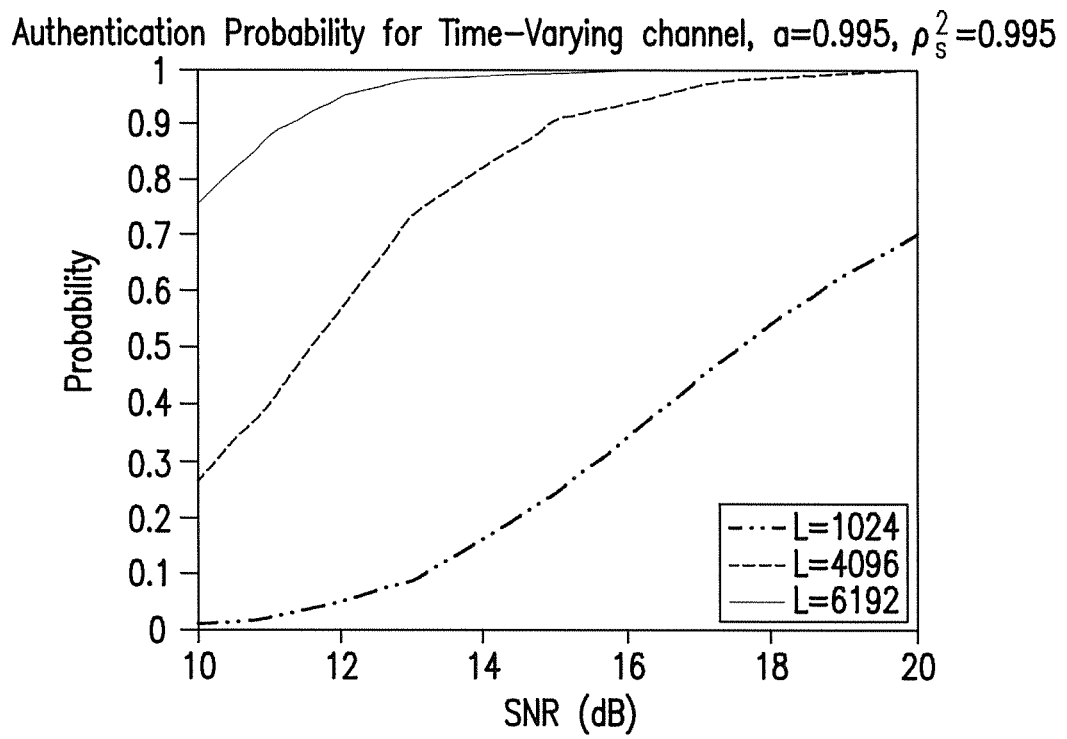
FIG. 18 is a graphical diagram representative of a probability of tagged detection for various tag length with time varying channel.
Figure 19:
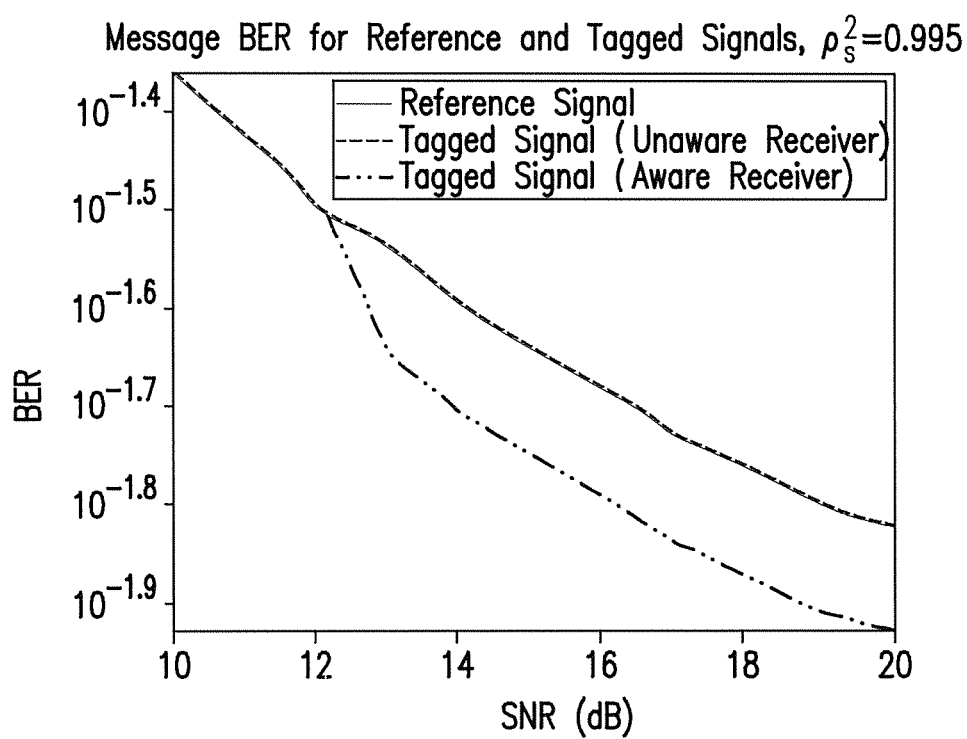
FIG. 19 is a graphical diagram representative of a message BER for reference and tagged signals.

The detection and probabilities for various tag lengths L are shown in FIG. 18. The tags are more easily detected at higher SNRs and for longer tag lengths. The BER versus SNR is shown in FIG. 19 for the particular case of L=4096. It is noted that the performance of the aware and unaware receivers coincide when the tag is not taken into account. However, when the tag is assumed to be present, the aware receiver with the key is able to decode the messages with lower BER. The decrease in BER is not apparent at low SNRs because the tags are not detected and hence the improved channel estimate is not used. At higher SNRs the tags are detected more often and the alternate channel estimate can be used.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, and in the process method steps described, particular steps may be reversed or interposed, all without departing from the spirit or scope of the invention as defined in the appended Claims.

What is being claimed is:

1. A method for communication authentication at the physical layer of the Open Systems Interconnection (OSI) model used by a wireless communication system including at least one transmitting node and at least one receiving node, the method comprising the steps of:
   a. connecting said at least one transmitting node and said at least one receiving node with a wireless communication channel, and configuring the Physical Layer of the OSI model used by said at least one transmitting node with a tag generator unit;
   b. providing both said at least one transmitting node and said at least one receiving node with a secret key k;
   c. forming, at the Physical Layer of the OSI model used by said at least one transmitting node, a message signal $s_i$ to be transmitted to said at least one receiving node, wherein $s_i = f_e(b_i)$, where $f_e$ is an encoding function, and $b_i$ is a message to be transmitted,
   constructing, in said tag generator unit residing at the Physical Layer of the OSI model used by said at least one transmitting unit, an authentication tag $t_i$ generated as a function of said message signal $s_i$ and said secret key k, and constructing, at the Physical Layer of the OSI model used by said at least one transmitting node, a tagged signal $x_i=\rho_s s_i+\rho_t t_i$, wherein $\rho_s$ and $\rho_t$ are coefficients selectively allocating transmission energy for construction of the tagged signal $x_i$ respectively between the message signal $s_i$ and the authentication tag signal $t_i$ in said tagged signal according to a set of characteristics of the wireless communication channel to adjustably conceal the authentication tag $t_i$ as signal propagation anomalies in the wireless communication channel, and $0<\rho_s,\rho_t<1$;

d. transmitting said tagged signal $x_i$ to said at least one receiving node via said wireless communication channel;

e. estimating said wireless communication channel, at the Physical Layer of the OSI model used by said at least one receiving node, upon receiving a communication signal $\hat{x}_i$ based on pilot symbols p detected in said received communication signal at the Physical Layer of the OSI model used by said at least one receiving node;

f. performing, at the Physical Layer of the OSI model used by said at least one receiving node, analysis of the received communication signal $\hat{x}_i$ for the presence of said authentication tag therein based on said secret key k and the estimation of said wireless communication channel;

g. establishing, at the Physical Layer of the OSI model used by said at least one receiving node, the authenticity of said received communication signal $\hat{x}_i$ if said authentication tag is detected therein; and h. recovering, at the Physical Layer of the OSI model used by said at least one receiving node, said message $b_i$ from said received communication signal $\hat{x}_i$ upon establishing the authenticity thereof.

2. The method of claim 1, further comprising the step of: upon construction of said tagged signal $x_i$, adding said pilot symbols p thereto.

3. The method of claim 1, further comprising the step of: in said step (e), estimating said wireless communication channel based on observations $y_p$ of the pilot symbols p at the Physical Layer of the OSI model used by said at least one receiver node.

4. The method of claim 1, further comprising the step of: in said step (c), generating said authentication tag $t_i=g(s_i,k)$ in said tag generating unit, wherein g is a tag generating function.

5. The method of claim 4, wherein said authentication tag $t_i$ depends on said message signal number i from said message signal $s_i$ and said secret key k.

6. The method of claim 1, further comprising the step of: in said step (h), removing said detected authentication tag $t_i$ from said received communication signal $\hat{x}_i$ to recover a message $$b_i = f_d\left(\frac{1}{\rho_s}[\hat{x}_i - g_t \cdot t_i]\right),$$

wherein $f_d$ is a message signal decoding function.

7. The method of claim 1, further comprising the steps of: in said step (f), after estimating said wireless communication channel, obtaining message signal estimation $\hat{s}_i$ from said received communication signal $\hat{x}_i$, generating an estimated tag $\hat{t}_i=g(\hat{s}_i,k)$, determining the presence of said estimated tag $\hat{t}_i$ by match filtering the residual $$r_i = \frac{1}{\rho_t}(\hat{x}_i - \rho_s f_e(\hat{b}_i)),$$

with said estimated tag $\hat{t}_i$, and establishing the authenticity of said received communication signal $\hat{x}_i$ based on a threshold probability of the tag detection for a predetermined model of said wireless communication channel.

8. The method of claim 1, wherein said tagged signal $x_i$ obeys bandwidth constraints of said message signal $s_i$.

9. The method of claim 1, further comprising the step of: flagging the received communication signal $\hat{x}_i$ as an anomalous signal if noise parameters thereof exceed predetermined values at said at least one receiving node.

10. The method of claim 1, further comprising the step of: generating said authentication tag signal with an energy below a predetermined value.

11. The method of claim 1, wherein said authentication tag signal follows a noise-like distribution function.

12. The method of claim 1, further comprising the step of: increasing the power of the transmitted tagged signal $x_i$ to raise the signal-to-noise ratio (SNR) of said wireless communication channel.

13. The method of claim 7, further comprising the steps of: establishing the authenticity of said received communication signal based on analysis of at least one sequence of multiple tagged signal blocks.

14. The method of claim 1, wherein said authentication tag signal is time varying signal.

15. The method of claim 4, wherein said tag generating function g is a pseudo-random number generator, and wherein said secret key k has a predetermined entropy value.

16. The method of claim 1, further comprising the step of: protecting said secret key by increasing the noise of transmission in said wireless communication channel.

17. The method of claim 1, further comprising the step of maintaining the transmission power of $\rho_s^2 \geq 0.985$.

18. A wireless communication system with transmission authentication at the physical layer thereof; comprising:

at least one transmitting node connected to at least one receiving node by a wireless communication channel, wherein the Physical Layer of the Open System Interconnection (OSI) model used by said at least one transmitting node is configured with a tag generator, a secret key k shared by said at least one transmitting node and said at least one receiving node, wherein said tag generator having an input from a demodulator generates an authentication tag signal as a function of a message signal $s_i$; and the secret key k, $t_i=g(s_i,k)$, wherein g is a tag generating function, k is a secret key, and $s_i$ is a message signal, wherein $s_i=f_e(b)$, where $f_e$ is an encoding function, and b is a message to be transmitted, a tagged signal $x_i$ constructing unit residing at a Physical Layer of the OSI model used by said at least one transmitting node, said tagged signal $x_i$ constructing unit being coupled to said $t_i$ and $s_i$ to output said tagged signal $x_i=\rho_s \cdot s_i+\rho_t \cdot t_i$, wherein $\rho_s$ and $\rho_t$ are coefficients selectively allocating transmission energy for construction of the tagged signal $x_i$ between the message signal $s_i$ and the authentication tag signal $t_i$ according to a set of characteristics of the wireless communication channel to adjustably conceal the authentication tag $t_i$ as signal propagation anomalies in the wireless communication channel, and wherein $0 < \rho_s, \rho_t < 1$, an authenticity decision unit residing at the Physical Layer of the OSI model used by said at least one receiving node, wherein said authenticity decision unit establishes the authenticity of a communication signal $\hat{x}_i$ received at said at least one receiving node based on detection of said authentication tag signal $t_i$ in said communication signal $\hat{x}_i$, based on estimation of said wireless communication channel, and a message recovering unit residing at the Physical Layer of the OSI model used by said at least one receiving node and coupled to said authenticity decision unit.

19. The wireless communication system of claim 18, wherein said tag generation function g is a pseudo-random number generator, and wherein said secret key k has a predetermined entropy value.

20. The wireless communication system of claim 18, wherein said tag signal $t_i$ is a time varying signal, wherein said tagged signal $x_i$ has bandwidth similar to said message signal $s_i$, wherein said at least one receiving node establishes the authenticity of the received communication signal based on analysis of sequences of multiple tagged signal blocks, and wherein said $\rho_s^2 \geq 0.985$.

* * * * *